(12) United States Patent
Naito

(10) Patent No.: US 8,315,501 B2
(45) Date of Patent: Nov. 20, 2012

(54) REPRODUCTION APPARATUS AND REPRODUCTION METHOD

(75) Inventor: Hitoshi Naito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1210 days.

(21) Appl. No.: 11/711,814

(22) Filed: Feb. 27, 2007

(65) Prior Publication Data

US 2007/0212029 A1   Sep. 13, 2007

(30) Foreign Application Priority Data

Mar. 1, 2006   (JP) .............................. P2006-054713

(51) Int. Cl.
*H04N 5/765* (2006.01)
*H04N 5/931* (2006.01)

(52) U.S. Cl. ........................ 386/200; 386/204

(58) Field of Classification Search ........................ None
See application file for complete search history.

(56) References Cited

U.S. PATENT DOCUMENTS

| | | | |
|---|---|---|---|
| 5,696,557 A | 12/1997 | Yamashita et al. | |
| 5,945,931 A | 8/1999 | Tahara et al. | |
| 2001/0028790 A1* | 10/2001 | Numata | 386/111 |
| 2003/0021346 A1* | 1/2003 | Bixby et al. | 375/240.25 |
| 2006/0088286 A1 | 4/2006 | Shibata et al. | |
| 2006/0133770 A1 | 6/2006 | Shibata et al. | |

FOREIGN PATENT DOCUMENTS

| | | |
|---|---|---|
| JP | 8-79688 | 3/1996 |
| JP | 11-205739 | 7/1999 |
| JP | 2000-83215 | 3/2000 |
| JP | 2000-341635 | 12/2000 |
| JP | 2002 101379 | 4/2002 |
| JP | 2004-112769 | 4/2004 |
| JP | 2004-208319 | 7/2004 |
| JP | 3763172 | 1/2006 |
| JP | 2006 88286 | 4/2006 |
| JP | 3794429 | 4/2006 |
| JP | 2006 157867 | 6/2006 |

* cited by examiner

*Primary Examiner* — William C Vaughn, Jr.
*Assistant Examiner* — Oluwaseun A Adegeye
(74) *Attorney, Agent, or Firm* — Frommer Lawrence & Haug LLP; William S. Frommer; Ellen Marcie Emas

(57) ABSTRACT

A reproduction apparatus is disclosed. A reproduction section reproduces video data from a record medium. The video data are managed in a unit of a clip composed of a plurality of frames which are chronologically successive. A first decode section decodes a first clip which is currently being output and stores the decoded first clip. A second decode section pre-decodes at least a frame which is output at beginning of a second clip adjacent to the first clip in a reproduction order and stores the decoded frame. A control section which controls a clip adjacent to a decoded position side of the first clip in the reproduction order to become the second clip for an early region and a late region of a time length based on a center position of a reproduction time length of the first clip.

12 Claims, 24 Drawing Sheets

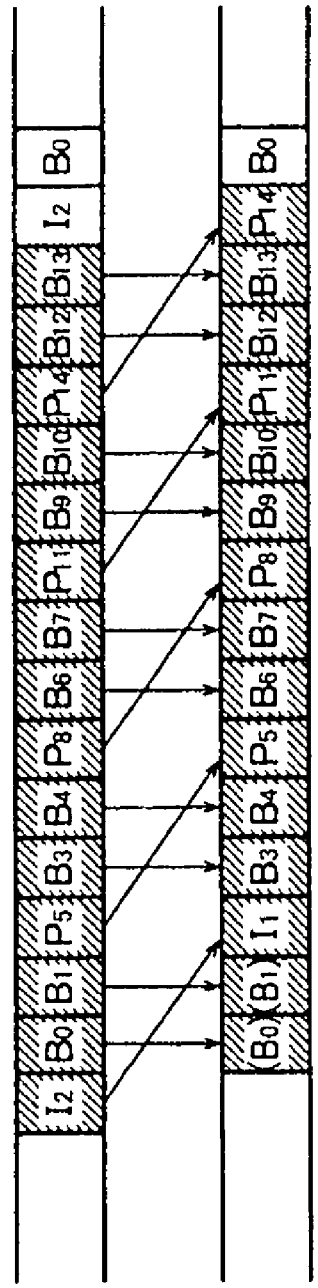
Fig. 1A
Fig. 1B
Fig. 1C

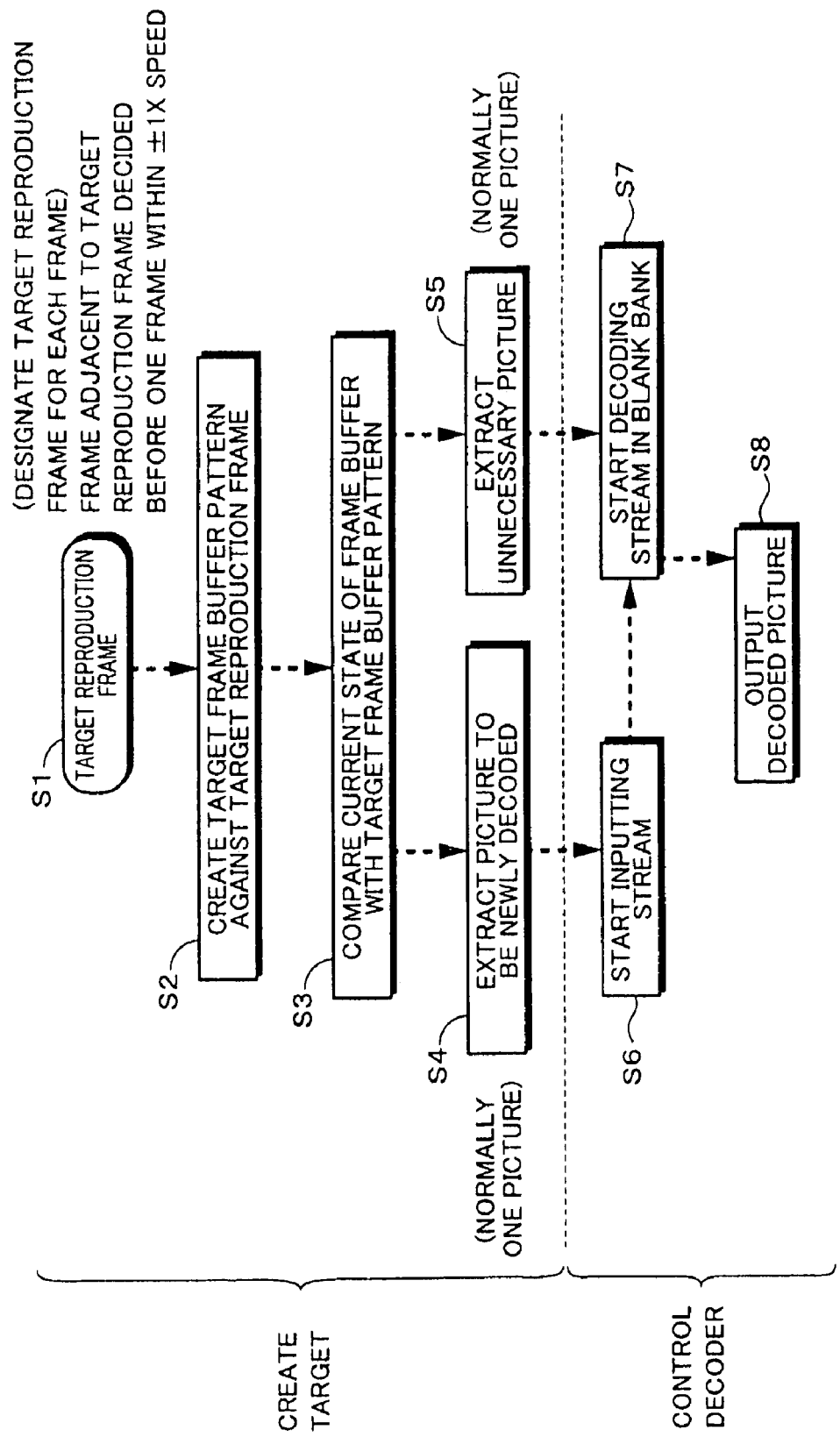

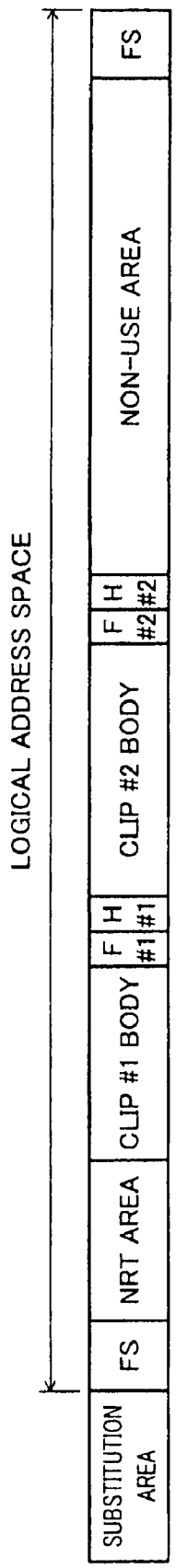

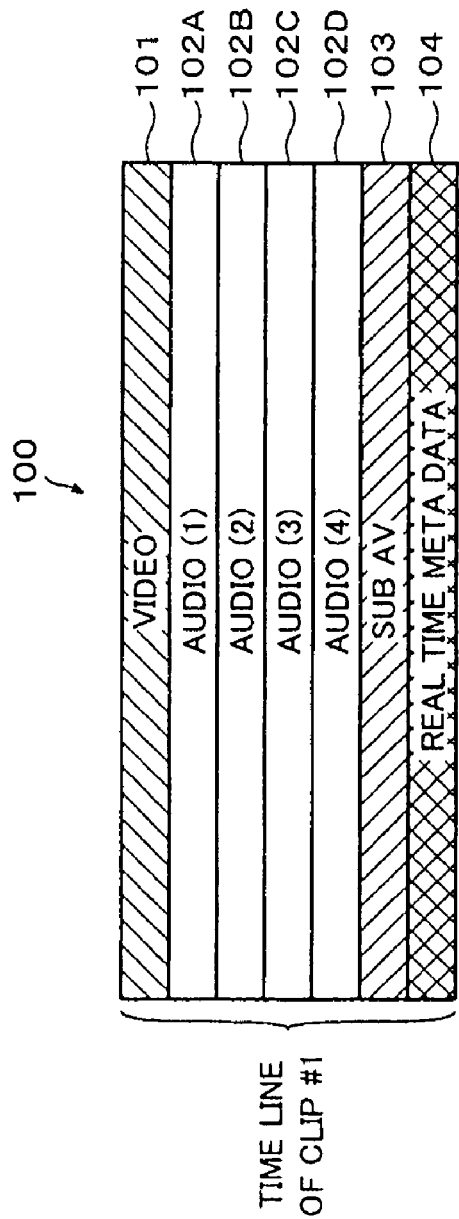
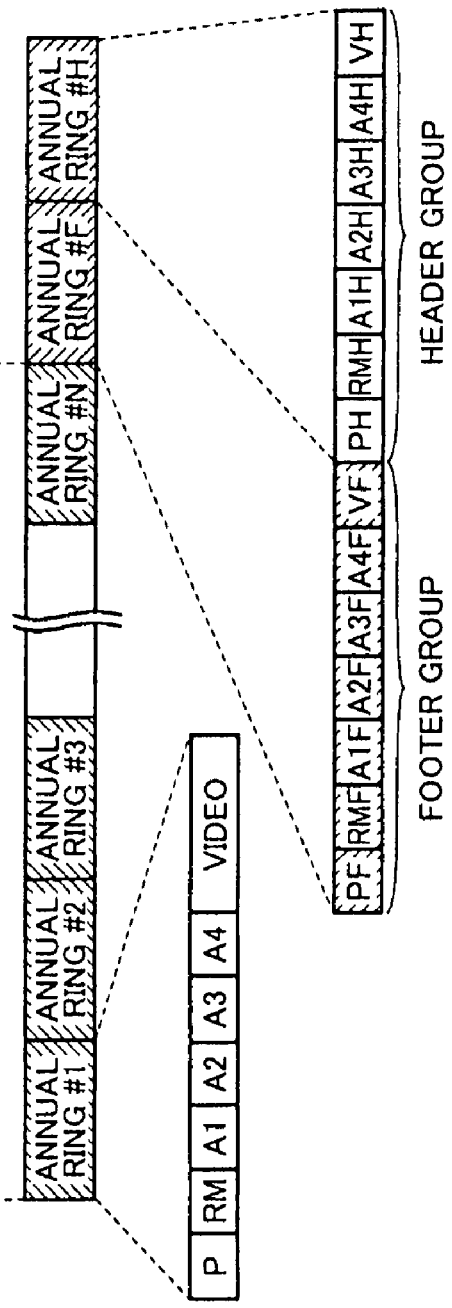
Fig. 7A
Fig. 7B
Fig. 7C
Fig. 7D

Fig. 10

| | SIZE | (RESERVED) | FILE ADDRESS |
|---|---|---|---|
| | | | VERSION ID (0x01) |
| #0 | ... | B | ... |
| #1 | ... | B | ... |
| #2 | ... | I | ... |
| ... | ... | B | ... |
| ... | ... | B | ... |
| ... | ... | P | ... |
| ... | ... | ... | ... |
| ... | ... | ... | ... |
| ... | ... | ... | ... |
| #n | ... | P | ... |

- 1 BIT — ORDER OF LIST (DISPLAY ORDER FRAME NUMBER); 1: TOP OF GOP, 0: OTHER
- 23 BITS (Max: 8 MB) / 3 BYTES
- 2 BITS — PICTURE TYPE
- 38 BITS (Max: 256 GB) / 5 BYTES
- 8 BYTES total

REPRODUCTION APPARATUS AND REPRODUCTION METHOD

CROSS REFERENCES TO RELATED APPLICATIONS

The present invention contains subject matter related to Japanese Patent Application JP 2006-054713 filed in the Japanese Patent Office on Mar. 1, 2006, the entire contents of which being incorporated herein by reference.

BACKGROUND OF THE INVENTION

1. Field of the Invention

The present invention relates to a reproduction apparatus and a reproduction program that allow a video signal that has been compression-encoded based on an interframe-compression encoding method with a prediction code to be successively reproduced between clips.

2. Description of the Related Art

A data record and reproduction apparatus that records a digital video signal and a digital audio signal to a record medium and reproduces these signals therefrom is known. As a record medium on which a digital video signal and a digital audio signal are recorded, a record medium such as a magnetic tape that is serially accessed has been widely used. In recent years, record mediums such as an optical disc, a hard disk, and a semiconductor memory that are randomly accessible have been widely used for recording and reproducing a digital video signal and a digital audio signal.

Since the data capacity of a digital video signal is huge, it is normally compression-encoded according to a predetermined system and then recorded on a record medium. In recent years, the MPEG2 (Moving Picture Experts Group 2) system has been known as a typical compression-encoding system. In the MPEG2, a digital video signal is compression-encoded based on the DCT (Discrete Cosine Transform) and motion compensation. The compression rate of data is improved with a variable length code.

Next, the structure of a data stream of the MPEG2 will be described in brief. The MPG2 is a combination of both predictive encoding with motion compensation and compression encoding based on the DCT. Data of the MPEG2 are hierarchically structured as a block layer, a macro block layer, a slice layer, a picture layer, a GOP layer, and a sequence in the order from the bottom layer to the top layer. The block layer is composed of DCT blocks each of which is a unit of a DCT process. The macro block layer is composed of a plurality of DCT blocks. The slice layer is composed of a header portion and at least one macro block. The picture layer is composed of a header portion and at least one slice. One picture corresponds to one screen.

The GOP layer is composed of a header portion, an I (Intra-coded) picture based on intra-frame encoding, a P (Predictive-coded) picture based on predictive encoding, and a B (Bi-directionally predictive coded) picture. An I picture can be decoded only with its own information. A P picture necessitates an earlier picture than the current P picture as a reference picture. A B picture necessitates an earlier picture and a later picture than the current picture as reference pictures. Both a P picture and a B pictures are not decoded with themselves. For example, a P picture is decoded with an I picture or a P picture earlier than the current P picture as a reference picture. A B picture is decoded with two pictures of an I picture or a P picture earlier and later than the current picture as reference pictures. A group that includes at least one I picture and that is complete with itself is referred to as a GOP (Group Of Picture). A GOP is a minimum accessible unit in an MPEG stream.

A GOP is composed of one or a plurality of pictures. In the following description, for convenience, a GOP composed of only one I picture is referred to as a single GOP. In contrast, a GOP composed of a plurality of an I picture, a P picture and/or a B picture is referred to as a long GOP. Since a single GOP is composed of only one I picture, data can be easily edited in the unit of a frame. In addition, since inter-frame predictive encoding is not performed for a single GOP, data can be decoded with higher picture quality than a long GOP. In contrast, since inter-frame predictive encoding is performed for a long GOP, data can be encoded with high compression efficiency.

There are two types of long GOPs, a closed GOP that has a closed structure of which the GOP can be completely decoded with itself and an open GOP that can be decoded with information about a GOP earlier by one GOP than the current GOP in the decoding order. Since an open GOP is decoded with more information than a closed GOP, the picture quality of the former is higher than that of the latter. Thus, an open GOP is generally used. In the following description, a "GOP" refers to an open GOP unless otherwise specified.

As a format of a video signal, the SD (Standard Definition) format having a bit rate of 25 Mbps (mega bits per second) is known. Especially, in video devices for broadcasting stations, editing environment of high picture quality and high accuracy has been accomplished with a video signal in the SD format and single GOP. A video signal in the SD format has a fixed bit rate of which the bit rate per frame is fixed.

On the other hand, in recent years, as digital high-vision broadcasts and so forth have been started, the HD (High Definition) format that has a higher resolution than the SD format has been used. In the HD format, as the resolution of a video signal increases, the bit rate thereof becomes higher than that of the SD format. Thus, with a single GOP, it is difficult to record a video signal on a record medium for a long time. To solve this problem, a video signal in the HD format is recorded with a long GOP. In a long GOP, inter-frame compression with a predictive code is performed. Thus, a video signal with a long GOP has variable bit rates that vary frame by frame.

Next, with reference to FIG. 1A to FIG. 1C, a decode process for a long GOP will be described. In this example, it is assumed that one GOP is composed of a total of 15 pictures that are one I picture, four P pictures, and 10 B pictures. As exemplified in FIG. 1A, the display order of I, P, and B pictures of the GOP is "$B_0 B_1 I_2 B_3 B_4 P_5 B_6 B_7 P_8 B_9 B_{10} P_{11} B_{12} B_{13} P_{14}$" where subscripts represent display order numbers.

In this example, the first two pictures, $B_0$ picture and $B_1$ picture, are pictures that have been predicted decoded with the last picture, $P_{14}$ picture, of a GOP earlier by one GOP than the current GOP and $I_2$ picture of the current GOP. The first P picture, $P_5$ picture, of the current GOP is a picture predicated and decoded with $I_2$ picture. The other P pictures, picture $P_8$, picture $P_{11}$, and picture P14, are pictures predicted and decoded with a P picture earlier by one picture than the current picture. B pictures later than an I picture are pictures predicted and decoded with an I picture or a B picture earlier by one picture than the current picture and an I picture or a B picture later by one picture than the current picture.

In addition, since a B picture is predicted and decoded with an I picture or a P picture earlier by one picture than the current picture and an I picture or a P picture later by one picture than the current picture, it is necessary to decide the order of I, P, and B pictures in a stream or on a record medium taking account of the decoding order of these picture in a decoder. In other words, it is necessary to have decoded I picture(s) and/or P picture(s) with which a B picture is decoded before the it is decoded.

In the foregoing example, as exemplified in FIG. 1B, individual pictures are arranged in a stream or on a record medium as "$I_2B_0B_1P_5B_3B_4P_8B_6B_7P_{11}B_9B_{10}P_{14}B_{12}B_{13}$". In this order, the pictures are input to the decoder. In this example, subscripts represent display order numbers corresponding to those shown in FIG. 1A.

As shown in FIG. 1C, in the decode process of the decoder, first of all, $I_2$ picture is decoded. $B_0$ picture and $B_1$ picture are predicted and decoded with $I_2$ picture that has been decoded and $P_{14}$ picture of a GOP earlier by one GOP than the current GOP (in the display order). $B_0$ picture and $B_1$ picture are output from the decoder in their decoded order. Thereafter, $I_2$ picture is output. When $B_1$ picture is output, picture $P_5$ is predicted and decoded with $I_2$ picture. Thereafter, $B_3$ picture and $B_4$ picture are predicted and decoded with $I_2$ picture and $P_5$ picture. $B_3$ picture and $B_4$ picture that have been decoded are output from the decoder in their decoded order. Thereafter, $P_5$ picture is output.

Thereafter, in the same manner, P picture(s) and/or I picture(s) that are used to predict a B picture are decoded before the B picture is decoded. The B picture is decoded with the decoded P picture(s) and/or I picture(s). The process of outputting a decoded B picture and then outputting P picture(s) and/or I picture(s) that have been used to decode the B picture is repeated. The picture arrangement as shown in FIG. 1B on a record medium or in a stream is commonly used. To decode these pictures, a frame memory having a storage for four frames will be used. A method of decoding an MPEG2 elementary stream is described in "Key Point Explanation, Latest MPEG Textbook (translated title)", Hiroshi Fujiwara, First Edition, ASCII Company, Aug. 1, 1994, p. 106 (hereinafter this document may be referred to as non-patent document 1).

The 1× speed reproduction operation in the forward direction for a video signal using a long GOP can be performed by a decoder that can obtain a decoded result of a picture of one frame in a time period for one frame (hereinafter, this decoder is referred to as the 1× speed decoder).

SUMMARY OF THE INVENTION

In an application that handles a video signal, a block of data in the unit that secures a continuously synchronous reproduction, namely a real time reproduction, is referred to as a clip. For example, a block of data after a video camera starts photographing an object until it stops photographing it is a clip.

Next, a reproduction that strides across clips will be considered for example in the case after clip #1 has been reproduced, clip #2 is successively reproduced. When a video signal has been encoded with single GOPs, as described above, the decoding process is complete in the unit of a frame. Thus, after clip #1 has been reproduced, pictures of clip #2 are successively decoded and output without any problem.

In contrast, when a video signal has been encoded with long GOPs, as described above, a target picture may be decoded with pictures that are earlier and later the target picture. In other words, unless a target picture is an I picture, when the target picture is decoded, a picture earlier than the target picture (when the target picture is a P picture) or a picture earlier than the target picture and a picture later than the target picture (when the target picture is a B picture) become necessary.

After one clip has been reproduced, when another clip is successively reproduced, the chronological relationship of pictures becomes discontinuous. In the case that one 1× speed decoder is used, after one clip has been reproduced, when another clip is reproduced, it is necessary to decode a picture earlier than a target picture or a picture earlier than the target picture and a picture later than the target picture before the target picture is decoded. Thus, after a desired picture or desired pictures have been decoded, a target picture is decoded with the decoded picture(s). Consequently, in the case that a video signal encoded with long GOPs is decoded with one 1× speed decoder, after one clip has been reproduced, when another clip is reproduced, the decoder may stop its output.

In particular, when clips are reproduced in the reverse direction, to decode one picture, it is necessary to use more pictures. In this case, after one clip has been reproduced, when another clip is reproduced, the decoder stops its output longer than the case that clips are reproduced in the forward direction.

For example, the case that one GOP is composed of the foregoing pictures, namely one I picture, four P pictures, and 10 B pictures as "$B_0B_1I_2B_3B_4P_5B_6B_7P_8B_9B_{10}P_{11}B_{12}B_{13}P_{14}$" (in the display order) will be considered. In this case, assuming that clips are reproduced in the reverse direction and a target picture is the last picture, $P_{14}$ picture, of the next GOP, to decode $P_{14}$ picture, it is necessary to decode four pictures, $I_2$ picture, $P_5$ picture, $P_8$ picture, and $P_{11}$ picture. While these pictures are being decoded, the decoder stops its output.

To solve this problem, it can be thought that two 1× speed decoders #1 and #2 are used and decoder #1 successively decodes target pictures of clip #1 that is being reproduced and decoder #2 decodes target pictures of clip #2 that will be reproduced after clip #1 has been reproduced. In this case, after clip #1 has been reproduced, when clip #2 is reproduced, the output of decoder #1 is switched to the output of decoder #2 in synchronization with timing of each frame.

However, likewise, in this method, after clip #1 has been reproduced, when clip #2 is reproduced, although a frame of the first picture of clip #2 is output at predetermined timing, frames of second and later pictures may not be output.

In other words, when clips are reproduced in the forward direction, decoder #2 decodes a target picture of clip #2 in a predetermined manner and becomes a standby state. After clip #1 has been reproduced, when clip #2 is reproduced, it is necessary for decoder #2 to decode a picture earlier than the next target picture or a picture earlier than the next target picture and a picture later than the next target picture. While decoder #2 is decoding these pictures, decoder #2 stops its output.

In view of the foregoing, it would be desirable to provide a reproduction apparatus and a reproduction method that allow a video signal that has been compression-encoded based on an interframe-compression encoding method with a prediction code to be successively reproduced between clips such that an output is not stopped.

According to an embodiment of the present invention, there is provided a reproduction apparatus. The reproduction apparatus includes a reproduction section, a first decode section, a second decode section, and a control section. The reproduction section reproduces video data from a record medium. The video data are managed in a unit of a clip composed of a plurality of frames which are chronologically successive. The first decode section decodes a first clip which is currently being output and stores the decoded first clip. The second decode section pre-decodes at least a frame which is output at beginning of a second clip adjacent to the first clip in a reproduction order and stores the decoded frame. The control section which controls a clip adjacent to a decoded position side of the first clip in the reproduction order to become the second clip for an early region and a late region of a time length based on a center position of a reproduction time length of the first clip.

According to an embodiment of the present invention, there is provided a reproduction method. Video data are reproduced from a record medium. The video data are managed in a unit of a clip composed of a plurality of frames which are chronologically successive. A storage state of a frame buffer which stores the video data reproduced at the reproduction step is compared with a target reproduction frame buffer pattern which designates an output and a frame to be newly decoded or an unnecessary frame in a current state of the frame buffer is extracted. The decode section is controlled to pre-decode a frame of a second clip and store the pre-decoded frame in a frame buffer based on the target reproduction frame which is a frame which is currently being output in the first clip and a frame which is output at beginning of a second clip adjacent to the first clip in a reproduction order.

Video data are reproduced from a record medium. The video data are managed in a unit of a clip composed of a plurality of frames which are chronologically successive. A storage state of a frame buffer which stores the video data reproduced at the reproduction step is compared with a target reproduction frame buffer pattern which designates an output and a frame to be newly decoded or an unnecessary frame in a current state of the frame buffer is extracted. The decode section is controlled to pre-decode a frame of a second clip and store the pre-decoded frame in a frame buffer based on the target reproduction frame which is a frame which is currently being output in the first clip and a frame which is output at beginning of a second clip adjacent to the first clip in a reproduction order. Thus, since a clip to be pre-decoded against a clip that is currently being output is properly designated, the reproduction operation is preformed between clips, an output thereof is not stopped.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1A to FIG. 1C are schematic diagrams describing a decode process in the case of a long GOP;

FIG. 2 is a schematic diagram showing a concept of a reproduction control process of a system according to an embodiment of the present invention;

FIG. 6 is a schematic diagram showing an example of a data arrangement on a disc-shaped record medium;

FIG. 7A to FIG. 7D are schematic diagrams describing a clip;

FIG. 10 is a schematic diagram showing a specific example of a picture pointer table describing picture pointer information;

DETAILED DESCRIPTION OF THE PREFERRED EMBODIMENTS

Next, embodiments of the present invention will be described in the following order.
1. System according to embodiment of present invention
1-1. Description of concept of reproduction control process
1-2. Example of structure of reproduction apparatus
1-3. Example of structure of decoder
1-4. Format of optical disc
1-5. More detailed description of reproduction control process
1-5-1. Creation of target frame buffer pattern
1-5-2. Example of target frame buffer update pattern
1-5-3. Flow of process of creating target frame buffer pattern
1-5-4. Reproduction control operation based on frame buffer update pattern 2. Another embodiment of present invention
2-1. Example of structure of reproduction apparatus
2-2. Reproduction control process

1. System According to Embodiment of Present Invention

First of all, a system according to an embodiment of the present invention will be described.

1-1. Description of Concept of Reproduction Control Process

FIG. 2 shows a concept of a reproduction control process for the system according to an embodiment of the present invention. At step S1, a target reproduction frame to be reproduced next is designated. A target reproduction frame has been decided before timing of its adjacent frame in the display order when the reproduction speed is within 1× speed in the forward direction or the reverse direction. A target reproduction frame is designated by for example a higher system than the system of this embodiment and supplied at timing of each frame.

After the target reproduction frame has been designated, a target frame buffer pattern for the target reproduction frame is created (at step S2). The target frame buffer pattern is a pattern of frames to have been decoded and stored in the frame buffer such that the target reproduction frame is reproduced and the next frame is continuously reproduced in the reverse direction and the forward direction. At step S3, the created target frame buffer pattern and the current state of the frame buffer are compared. As a result, a picture to be newly decoded against the current state of the frame buffer is extracted (at step S4). In addition, a picture that becomes unnecessary against the current state of the frame buffer is extracted (at step S5). The picture extracted at step S4 and step S5 is normally one picture.

Now that the process of creating a target to be actually decoded has been completed, the decoder is actually controlled to start the decode process.

At step S6, for example a record medium is accessed and a stream of a predetermined picture is input to the decoder based on the result extracted at step S4. A picture decoded by the decoder is overwritten to an area for the unnecessary picture extracted at step S5 (at step S7). After one picture has been decoded, the decoded picture is output as a decoded output frame picture (at step S8).

1-2. Example of Structure of Reproduction Apparatus

Figure 3:
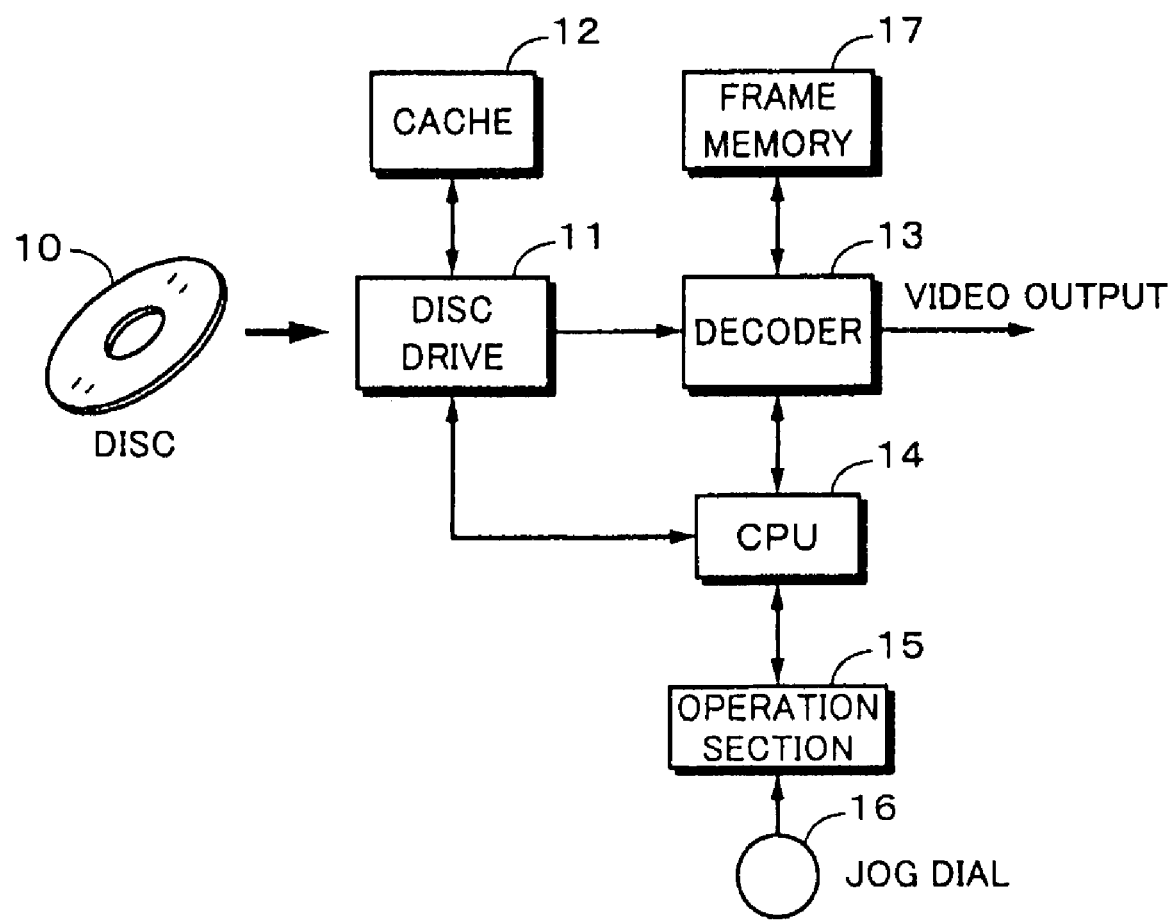
FIG. 3 is a block diagram showing an outline of an example of a structure of a reproduction apparatus of the system according to an embodiment of the present invention.

FIG. 3 shows an outline of an example of a structure of a reproduction apparatus 1 of the system according to this embodiment of the present invention. The reproduction apparatus 1 uses an optical disc 1 as a record medium. Connected to a CPU (Central Processing Unit) 14 are a ROM (Read Only Memory) and a RAM (Random Access Memory) (not shown). The CPU 14 controls each section of the reproduction apparatus 1 according to a program that is pre-stored in the ROM. The RAM is used as a work memory of the CPU 14.

A disc drive 11 reads data from a predetermined address of a loaded optical disc 10 under the control of the CPU 14. The data that have been read are temporarily stored in a cache memory 12. A video stream is supplied from the cache memory 12 to a decoder 13 according to a command issued from the CPU 14. When requested, the decoder 13 decodes the input video stream with a frame memory 17. The decoded video stream is output as a baseband video signal.

An operation section 15 is provided with various types of control parts such as keys and switches. The operation section 15 generates control signals based on operations to the control parts and supplies the control signals to the CPU 14. The CPU 14 supplies commands to individual sections of the reproduction apparatus 1 based on the supplied control signals. The operation section 15 is provided with for example a jog dial 16. The jog dial 16 outputs signals corresponding to its rotation angles. The jog dial 16 generates control signals that for example designate the forward direction or the reverse direction as the reproduction direction and designate the reproduction speed in real time based on user's operations and supplies these control signals to the CPU 14.

Commands that designate the reproduction speed, reproduction direction, and so forth are not limited to those based on user's operations to the operation section 15. For example, commands that designate the reproduction speed, reproduction direction, and so forth can be transmitted from another device such as an editing device to the reproduction apparatus 1 connected through a predetermined communication means (not shown). In this case, the other device that transmits commands to the reproduction apparatus 1 is a high level system thereof.

It is assumed that a video stream handled by the reproduction apparatus 1 is a stream that has been compression-encoded based on the MPEG2 (Moving Pictures Experts Group 2) standard. In addition, it is assumed that the structure of a GOP (Group Of Picture) is a long and open GOP).

1-3. Example of Structure of Decoder

Figure 4:
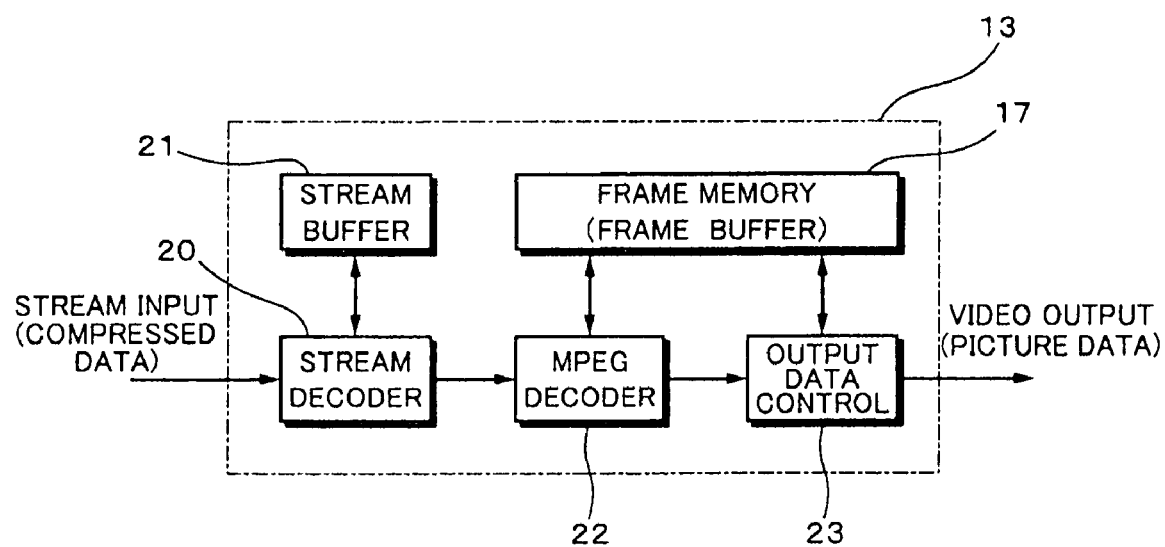
FIG. 4 is a block diagram showing an outline of an example of a structure of a decoder.

FIG. 4 shows an outline of an example of a structure of the decoder 13. Stream data that are read from the optical disc 10 and output from the disc drive 11 are for example an MPEG-ES (MPEG Elementary Stream). This MPEG-ES is supplied to a stream decoder 20. The stream decoder 20 analyzes a packet and header information of the input MPEG-ES and extracts various types of parameters that are necessary to perform the decode process and picture data stored in a payload of the packet, which has been compression-encoded. The extracted various types of parameters are supplied to for example the CPU 14. The extracted picture data are stored in a stream buffer 21 in a predetermined manner.

An MPEG decoder 22 requests the stream decoder 20 to read picture data from the stream buffer 21. As requested, the MPEG decoder 22 decodes the picture data that have been read from the stream buffer 21 and writes the picture data to the frame memory 17. On the other hand, the MPEG decoder 22 decodes other picture data (for example, a P picture and a B picture) with the picture data that have been written in the frame memory 17.

As will be described later in detail, the frame memory 17 has a storage capacity enough to execute the reproduction operation in the forward direction and the reproduction operation in the reverse direction with a fixed delay. For example, the frame memory 17 has a storage capacity enough to store nine frames of decoded pictures. For example, the frame memory 17 is divided into nine banks in which data for one frame can be stored and each of which can be access-controlled.

An output data control section 23 manages video data that are output. For example, the output data control section 23 reads frame data to be displayed next from the frame memory 17 according to commands issued from the CPU 14 based on user's operations to the operation section 15. The frame data are output as a baseband video signal.

Figure 5:
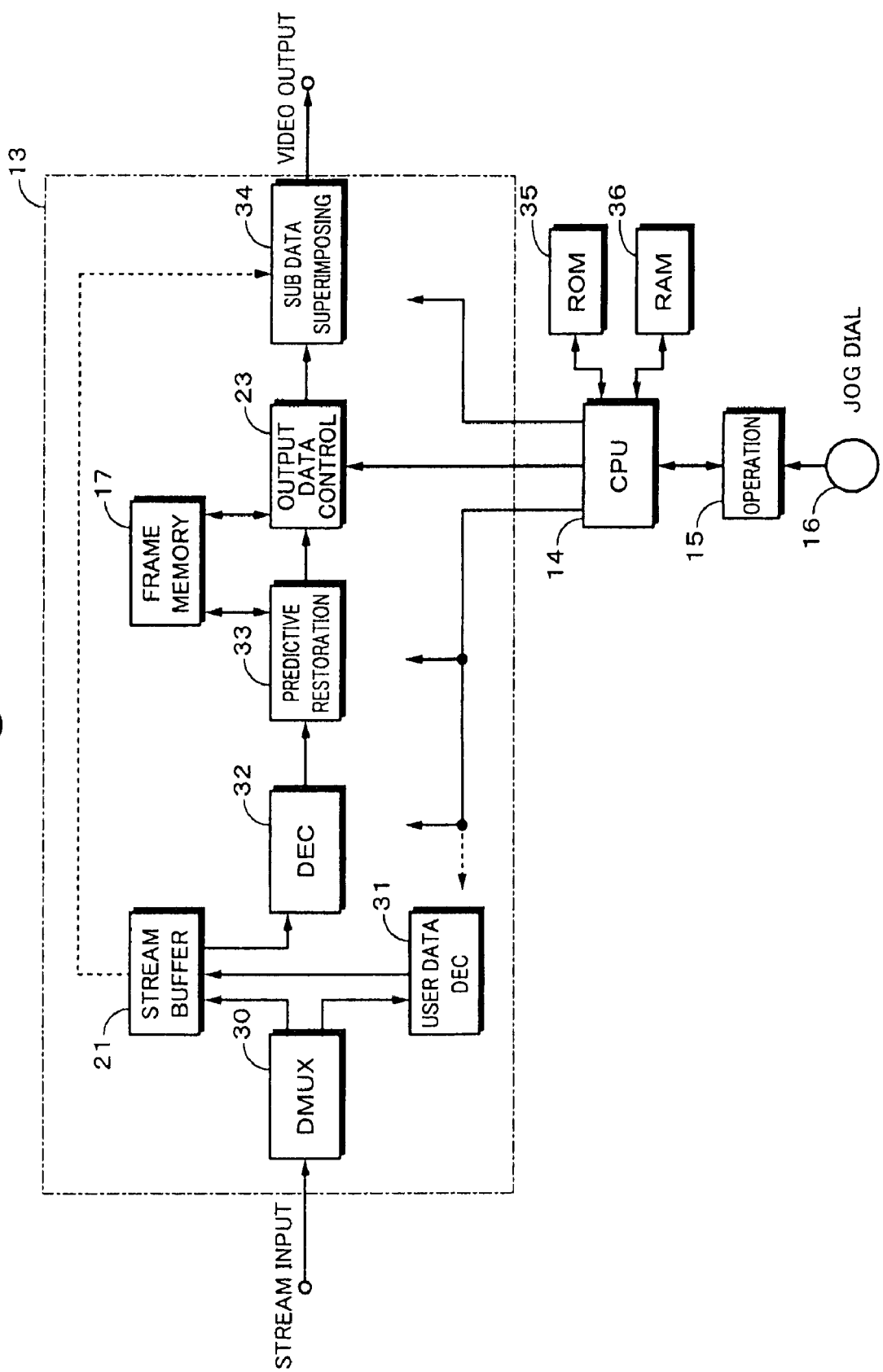
FIG. 5 is a block diagram specifically showing the example of the structure of the decoder.
Figure 8:
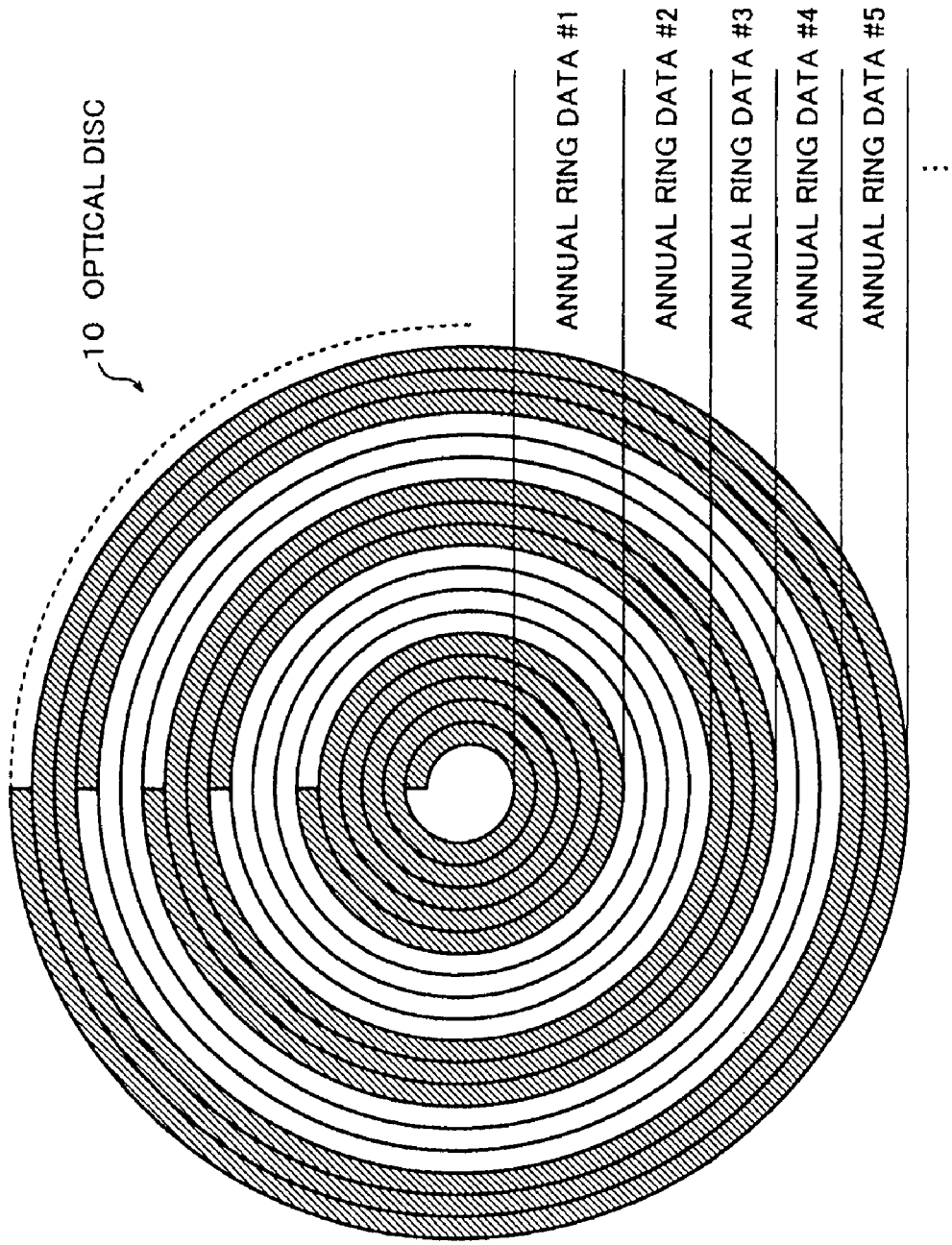
FIG. 8 is a schematic diagram showing an example of annual ring data formed on an optical disc.

FIG. 5 shows an example of the structure of the decoder 13 in more detail. In FIG. 5, similar sections to those in FIG. 4 will be represented by similar reference numerals and their description will be omitted. An MPEG-ES that is output from the disc drive 11 is supplied to a demultiplexer (DMUX) 30. The DMUX 30 analyzes a packet of the MPEG-ES. An MPEG ES and header information are extracted from the packet and stored in the stream buffer 21. The header information of the packet is also supplied to a user data decoder 31. The user data decoder 31 extracts various types of parameters from the header information. The extracted parameters are stored in the stream buffer 21 in a predetermined manner.

A decoder 32 decodes header information and the MPEG ES stored in the stream buffer 21. The decoder 32 decodes the header information and extracts parameters necessary to decode a picture. The decoder 32 performs a variable-length code decode process, an inverse quantizing process, and an inverse DCT (Discrete Cosine Transform) process for the MPEG ES based on the parameters extracted from the header information to decode each picture. The picture data that have been decoded by the decoder 32 are written to the frame memory 17 through a predictive restoration section 33.

The predictive restoration section 33 decodes a picture that has been inter-frame compressed based on a predictive code with picture data written to the frame memory 17. The decoded picture is rewritten as frame data to the frame memory 17.

On the other hand, when the user operates the jog dial 16 to designate the reproduction direction and the reproduction speed, the operation section 15 generates control signals that designate the reproduction speed and the reproduction direction in a predetermined manner. These control signals are supplied to the CPU 14. The control signals that designate the reproduction direction and the reproduction speed may be supplied from the foregoing high level system to the CPU 14 as commands through the communication means (not shown).

The CPU 14 issues a command to an output data control section 23 to designate a frame that the output data control section 23 outputs based on a program stored in a ROM 35 and on a control signal supplied from the operation section 15. When necessary, a RAM 36 is used as a work memory of the CPU 14. The output data control section 23 reads a designated frame from the frame memory 17 based on the command.

The frame that has been read from the frame memory 17 is supplied to a sub data superimposing section 34. The sub data superimposing section 34 superimposes the frame, video index information, sub data, and so forth based on information stored in the stream buffer 21. In addition, the sub data superimposing section 34 adds a synchronous signal to the superimposed signal and outputs the resultant signal as an output video signal.

1-4. Format of Optical Disc

Next, the optical disc 10 will be described. First of all, with reference to FIG. 6, an example of a data arrangement of a disc-shaped record medium will be described. The data arrangement exemplified in FIG. 6 is a typical data arrangement of a random-accessible disc-shaped record medium such as a recordable optical disc or a hard disk. A logical address space is an area from and to which any data can be recorded and reproduced.

A file system FS is disposed at each of the beginning and the end of logical addresses. Any data are recorded in the logical address space in a predetermined format referred to as a file. Data on the record medium are basically managed in the unit of a file. Management information of a file is recorded in the file system FS. A file system layer of a system control section (described later) of the record and reproduction apparatus can manage various types of data on one record medium by referencing and operating information of the file system FS. The file system FS uses for example the UDF (Universal Disk Format) and manages a file in the unit of 2 kB.

Disposed outside the logical address space is a substitution area. The substitution area is an area that can be used when a part of the record medium becomes unable to be physically read and/or written due to a defect of the record medium. While the record medium is being accessed (in particular data are being recorded on the record medium), if a defect area is detected, a substitution process is regularly performed. The address of the defect area is moved to the substitution area.

The use state of the substitution area is stored as a defect list in a predetermined area. The defect list is used by the drive control section of the record and reproduction apparatus and the lower hierarchical layers of the system control section. In other words, in the drive control section and the lower hierarchical layers thereof (that will be described later), when the record medium is accessed, with reference to the defect list, even if the substitution process has been performed, a proper area can be accessed. With the mechanism of the substitution area, a high level application can record and reproduce data to and from the record medium without necessity of taking account of presence or absence and position of defect record area on the record medium.

In the disc-shaped record medium, the substitution area is regularly disposed on the innermost circumference or the outermost circumference of the disc. When the rotation of the disc is controlled based on the zone control, of which rotation speed gradually increase with the radial distance of the disc, the substitution area may be disposed for each zone. In contrast, when the record medium is not a disc-shaped record medium such as a semiconductor memory, the substitution area is regularly disposed on the lowest physical address side or the highest physical address side.

In an application that deals with audio data and video data (hereinafter, they are collectively referred to as AV data), a block of data of which data are successively and synchronously reproduced, namely data are securely reproduced in real time are referred to as a clip. For example, a block of data after a photographing operation of a video camera is started until the photographing operation thereof is stopped is a clip. Entity of a clip is composed of a single file or a plurality of files. In this embodiment of the present invention, a clip is composed of a plurality of files. Details of a clip will be described later.

In the logical address space, an NRT (Non Real Time) area used to store any files other than clips is disposed for example on the top end side. After the NRT area, clips are successively placed. Clips are placed on the optical disc 10 free from defect positions such that the foregoing substitution process is not performed. A header (H) and a footer (F) are added to each clip. In this example, the header and the footer are disposed collectively on the last end side of each clip.

In the following description, a clip recorded at the beginning on the optical disc 10 is represented by clip #1. Thereafter, clip numbers increase for example clip #2, clip #3, and so forth.

In the logical address space, areas in which data are not recorded and areas in which data were recorded past and become unnecessary are managed as non-use areas by the file system FS. A file that is newly recorded on the record medium is assigned a record area based on the non-use areas. The management information of the file is added to the file system FS.

In the system according to this embodiment, clips are recorded in an annual ring structure to the record medium. With reference to FIGS. 7A to 7D and FIG. 8, the annual ring structure will be described. FIG. 7A shows an example of which one clip 100 is placed on a time line. In this example, the clip 100 is composed of seven files of video data 101, audio data 102A to 102D, sub AV data 103, and real time meta data 104.

The video data 101 are video data of which baseband video data have been compression-encoded at a bit rate as high as for example 50 Mbps (Mega bits per second). As the compression-encoding system, for example the MPEG2 (Moving Pictures Experts Group 2) system is used. The audio data 102A, 102B, 102C, and 102D are baseband audio data, each of which are two-channel audio data. Instead, the audio data 102A, 102B, 102C, and 102D may be audio data of which baseband audio data have been compression-encoded at a high bit rate. The video data 101 and audio data 102A to 102D are data that are actually broadcast and edited. These data are referred to as main data.

The sub AV data 103 are data of which baseband video data and baseband audio data have been compression-encoded and multiplexed at a lower bit rate than the main video data and audio data. As the compression-encoding system, for example the MPEG4 system is used. The sub AV data 103 are generated by compression-encoding the main AV data at as low as for example several Mbps. The sub AV data 103 are data used as a proxy of the main data and also referred to as proxy data.

The meta data are high level data of particular data. The meta data function as an index that represents contents of various types of data. The meta data are categorized as two types of the real time meta data 104 generated in time series of the main AV data and non-time-series meta data generated in predetermined regions such as scenes of the main AV data. The non-time-series meta data are recorded for example in the NRT area described with reference to FIG. 6.

As exemplified in FIG. 7B, the clip 100 is divided based on a predetermined reproduction time (for example, two seconds) and recorded in the annual ring structure to the optical disc. As exemplified in FIG. 7C, in one annual ring, each of the video data 101, audio data 102A to 102D, sub AV data 103, and real time meta data (RM) 104 are divided in the unit of a predetermined reproduction period having a data size equal to or larger than one track and the divided data are successively placed and recorded such that their reproduction time zones correspond to each other. In other words, each of these data that compose the clip 100 is interleaved in the unit of the predetermined time period and recorded on the optical disc.

Data that compose an annual ring are referred to as annual ring data. Annual ring data have a data amount of an integer multiple of the minimum record unit of the disc. In addition, annual rings are recorded such that their boundaries match block boundaries, each of which is the minimum record unit of the disc.

FIG. 7 shows an example of which annual ring data have been formed on the optical disc 10. For example, as described with reference to FIG. 7B, annual ring data #1, #2, #3, and so forth of which one clip has been divided in the unit of a predetermined reproduction time period are successively recorded from the inner circumference side to the outer circumference side of the optical disc 10. In other words, data are arranged from the inner circumference side to the outer circumference side of the optical disc 10 such that data are successively reproduced in time series. In the example shown in FIG. 8, the NRT area (not shown) is disposed on the inner circumference side of annual data #1.

In the HDD format, data can be compression-encoded at variable length bit rates. When a long GOP is used, since data are encoded based on inter-frame compression encoding with a predictive code using I pictures, P pictures, and B pictures, the data size of each frame varies. Thus, a desired position of each clip is accessed with a picture pointer file.

A picture pointer is offset information of each frame position in a clip. In other words, for example in the MPEG2, as variable bit rates, compression rates of data can be varied for individual frames. For example, a frame of a flat picture is compression-encoded at a higher compression rate than other frames. A frame of a coarse picture is compression-encoded at a lower compression rate than other frames. When compression rates are varied depending on characteristics of frames, video data having a high resolution can be transmitted and recoded at a lower bit rate. In the MPEG2, compression encoding is also performed with a variable length code.

In video data that have been compression-encoded at variable bit rates, the position of a frame and the position of a GOP that is complete with a plurality of frames vary for each frame and for each GOP. Thus, it is difficult to jump the reproduction position to a desired position of a clip. Thus, to easily access video data that have been compression-encoded at variable bit rates, offset information of each frame position of a clip is tabulated as picture points in a non-time-series meta data file and placed corresponding to each clip. When the disc is loaded into the drive, the picture points are read in a predetermined manner. As a result, a desired position of a clip can be accessed at high speed.

Figure 9:
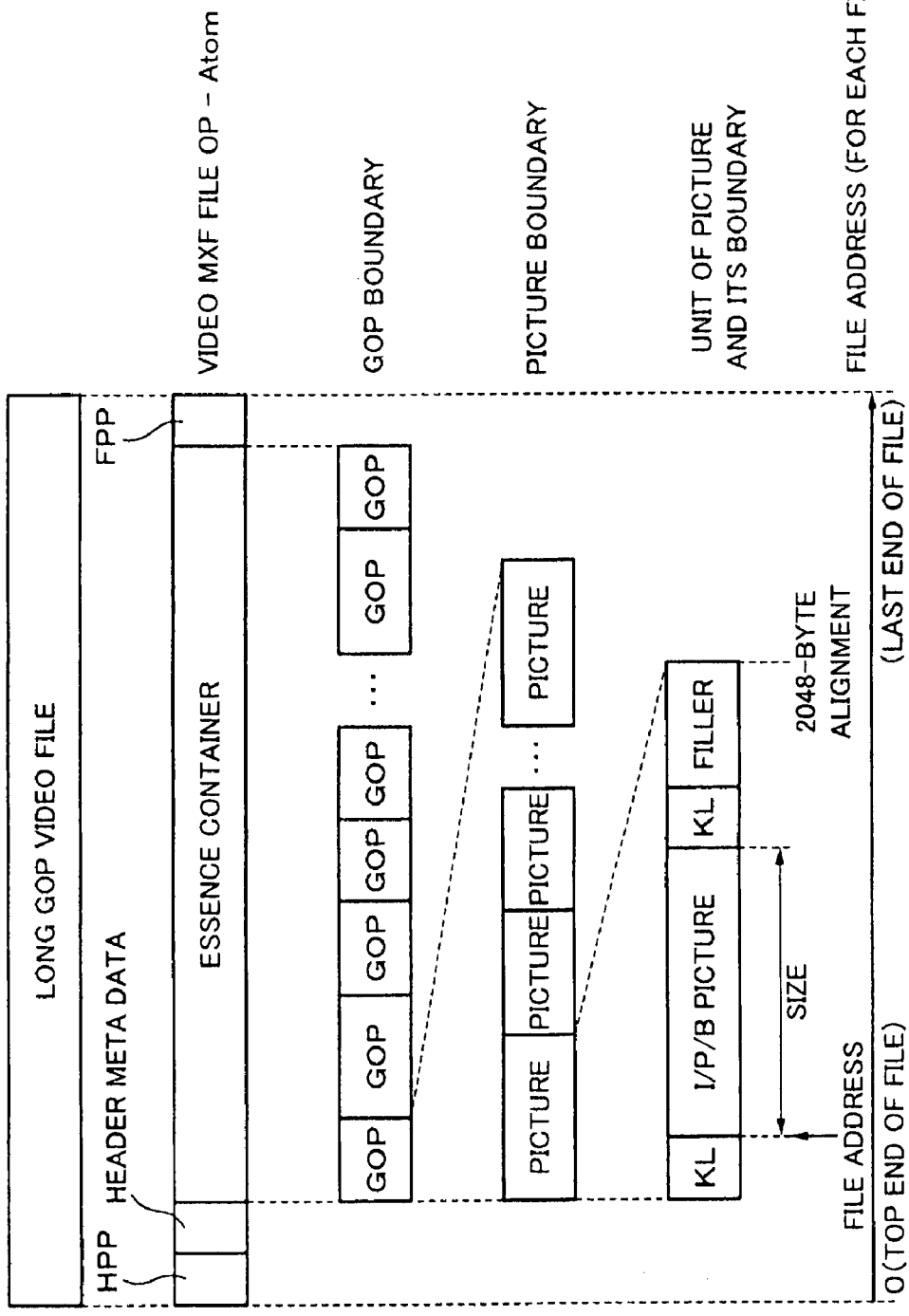
FIG. 9A to FIG. 9F are schematic diagrams showing an example of a data structure of a long GOP of the MPEG2.

Next, with reference to FIG. 9A to FIG. 9F and FIG. 10, this operation will be described in detail. FIG. 9A to FIG. 9F show an example of a data structure of a long GOP according to the MPEG2. For example, as shown in FIG. 9A, one long GOP file is composed of one clip. As shown in FIG. 9B, the long GOP file has a structure called a video MXF (Material Exchange Format) file OP-Atom that starts with a header partition pack (HPP) and header meta data that compose header information. The header meta data are followed by an essence container that contains the body of video data. The file ends with a footer partition pack (FPP).

As shown in FIG. 9C, the essence container is composed of a sequence of GOPs. As shown in FIG. 9D, each GOP is a group of pictures. As shown in FIG. 9E, one picture starts with KL (Key, Length) information. The KL information is followed by the body of an I picture, a P picture, or a B picture, followed by KL information. When necessary, each picture ends with a filler such that the picture is complete in the unit of one byte.

In such a structure, in the long GOP of the MPEG2, the information amount of each picture, namely the size of I, P, or B picture shown in FIG. 9E is indefinite. Thus, when a long GOP video file is reproduced, starting from a particular frame, the start position of a picture corresponding to the frame is not able to be designated with for example a byte position.

Thus, based on a file address represented from the start position of the long GOP video file in the unit of a byte (refer to FIG. 9F), for each picture contained in the long GOP video file, the file address, size, picture type (I, P, or B picture), and information representing whether the current picture is the top picture of the GOP) are provided as picture pointer information. The picture pointer information is provided for each long GOP video file.

The filler, which is placed at the last end of the picture as shown in FIG. 8E, adjusts the file address of the boundary of each picture to a multiple of predetermined bytes, for example 2048 bytes. When the boundary of each picture be adjusted with the filler such that the boundary matches the boundary of the minimum access unit that is a sector of the optical disc 10, each picture can be easily accessed.

FIG. 10 shows a more specific example of the picture pointer table, which describes the picture pointer information. In this example, the picture pointer table describes data in the unit of eight bytes. The first eight bytes describe a reserved area and version information of the picture pointer table. Thereafter, eight bytes are allocated to each frame, namely each picture. These eight-byte information is successively arranged for the number of pictures contained in the long GOP video file. Individual pictures are arranged in the display frame order.

Next, data of the picture pointer table for each picture will be described. The first one bit is a flag that denotes whether or not the current picture is the top picture of the GOP. Assuming that there are a plurality of I pictures in one GOP, the boundary of the GOP is not able to be identified only with the positions of the I pictures. When the boundary of the GOP is not identified, the position of a sequence header defined in the MPEG2 is not obtained. As a result, a stream that is input to the decoder may not have a sequence header. When each picture has the flag that denotes whether or not the current picture is the top picture of the GOP, such a situation can be prevented. When a stream is reproduced, it is input to the decoder based on the flag.

The next 23 bits describe size information of the current picture shown in FIG. 9E. Since these 23 bits are allocated for size information, the data size of up to 8 MB (Mega Bytes) can be handled. In addition, 422@HL of the MPEG profile can be handled.

The next two bits describe the type of the current picture. When the current picture is a B picture, these two bits also describe information of the reference direction. More specifically, these two bits describe the picture types as follows.
00: I picture
10: P picture
01: B picture decoded with reference to a frame earlier than the current picture (future frame). In the open GOP, the top B picture of a long GOP video file. In the closed GOP, the top B picture of each GOP.
11: B picture decoded with reference to a frame earlier than the current picture and a frame later than the current picture.

The next 38 bits describe a file address of the current picture in the log GOP video file. Since 38 bits are allocated for file addresses, long GOP video files having a size of up to 256 GB (Giga Bytes) can be handled. For example, an optical disc 10 having for example eight record layers each of which has a record capacity of 27 GB can be handled.

This picture pointer table is recorded as a picture pointer file in for example the NRT area of the record medium along with non-time-series meta data. When the optical disc 10 is loaded into the disc drive 11, the non-time-series meta data and picture pointer file are read from the NRT area of the optical disc 10 by the disc drive 11 and the optical disc 10 is mounted to the system of the reproduction apparatus 1. The non-time-series meta data and picture pointer file that have been read are stored for example in the RAM of the CPU 14. With reference to the picture pointer table stored in the RAM, the CPU 14 can access any picture of clips recorded on the optical disc 10.

1-5. More Detailed Description of Reproduction Control Process

Next, the reproduction control process of the system according to this embodiment of the present invention will be described in more detail.

1-5-1. Creation of Target Frame Buffer Pattern

First of all, the creation of the target frame buffer pattern at step S2 shown in FIG. 2 will be described. First, a frame buffer size necessary to reproduce a desired target reproduction frame and adjacent frames that are earlier and later by one frame than the target reproduction frame in the display order is obtained.

Figure 11A:
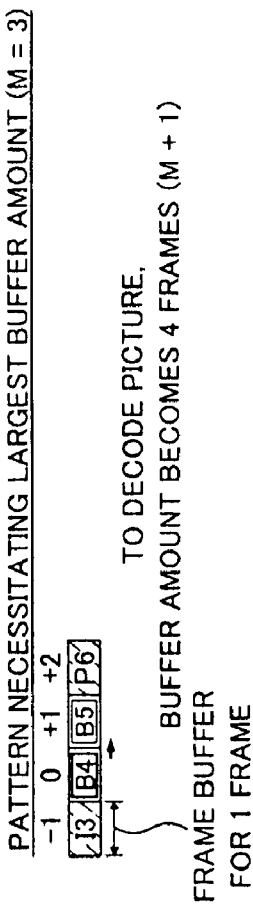
FIG. 11A to FIG. 11C are schematic diagrams showing an example of a necessary buffer amount for which a frame earlier by one frame than a current frame in the display order or a frame later by one frame than the current frame is decoded in the display order.
Figure 11B:
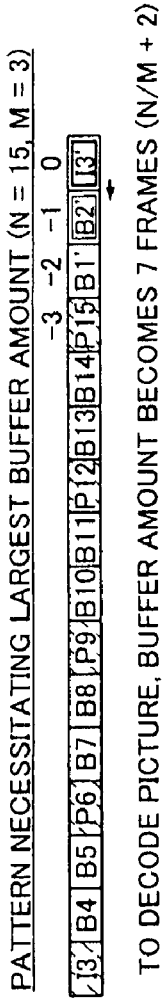
Figure 11C:
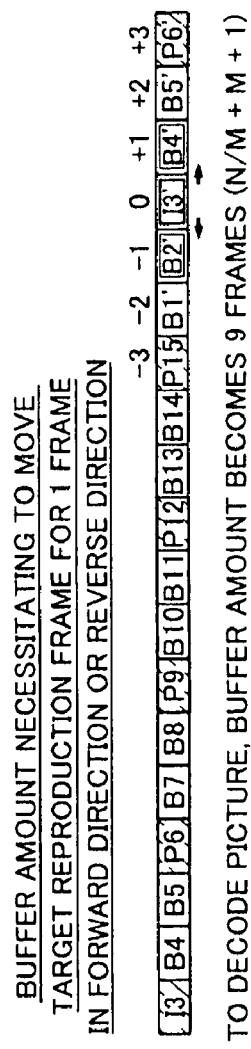

FIG. 11A to FIG. 11C show examples of buffer amounts in the case that a frame earlier or later by one frame than a current frame (for example, a target reproduction frame) in the display order is decoded. In FIG. 11A to FIG. 11C, an output frame (current frame) is represented by "0", a frame in the forward direction, namely future (later than) of the current frame in the display order is represented by "+", and a frame in the reverse direction, namely past (earlier than) of the current frame in the display order is represented by "−". In FIG. 11A to FIG. 11C, "M" represents the number of pictures from the reference picture to the next reference picture in the case that there is a B picture therebetween and "N" represents the number of pictures in one GOP. When a GOP is composed of 15 pictures of "$I_2B_0B_1P_5B_3B_4P_8B_6B_7P_{11}B_9B_{10}P_{14}B_{12}B_{13}$", M=3 and N=15.

FIG. 11A shows an example of which only one frame is reproduced in the forward direction. In this case, with M=3, when the target reproduction frame is a B picture earlier than the adjacent B picture in the display order, the buffer amount becomes the largest. In this case, the target reproduction frame is moved to the next B picture at timing of the next frame.

In other words, in this case, $B_4$ picture and $B_5$ picture are decoded with $I_3$ picture and $P_6$ picture, respectively. Until $B_5$ picture has been decoded, $I_3$ picture is not able to be removed from the buffer. In addition, since $P_6$ picture is displayed after $B_5$ picture, $P_6$ picture is stored in the buffer. Thus, in this case, the buffer amount becomes M+1=4 pictures.

FIG. 11B shows an example of which one frame is reproduced in the reverse direction. In the case of a regular open GOP with M=3 and N=15, when the target reproduction frame is $I_3'$ picture, the buffer amount becomes the largest. In this case, the target reproduction frame is moved to $B_2'$ picture later than the target reproduction frame in the reverse direction in the display order at timing of the next frame.

In other words, in this case, to decode $B_{2'}$ picture, $I_{3'}$ picture and $P_{15}$ picture earlier than $B_{2'}$ picture become necessary in the display order. To decode $P_{15}$ picture, $I_3$ picture, $P_6$ picture, $P_9$ picture, and $P_{12}$ picture of the GOP to which $P_{15}$ picture belongs successively becomes necessary. Thus, the buffer amount becomes N/M+2=7 pictures. In this case, N/M is equal to the number of I pictures and P pictures that belong to the GOP.

FIG. 11C shows an example of taking account of the case of which the reproduction position is moved for one frame in the forward direction or the reverse direction. In the case of a regular open GOP with M=3 and N=15, when the target reproduction frame is $I_3'$ picture, the buffer amount becomes the largest. In this case, the target reproduction frame is moved to $B_{4'}$ picture later by one frame than $I_{3'}$ picture in the display order or $B_{2'}$ picture earlier by one frame than $I_{3'}$ picture in the display order at timing of the next frame.

In other words, this case is a combination of the example shown in FIG. 11A and the example shown in FIG. 11B. To decode $B_{4'}$ picture later by one frame than $I_{3'}$ picture as the target reproduction frame in the display order, $I_{3'}$ picture and P6' picture later by one frame than $I_{3'}$ picture as a reference picture become necessary. In addition, to decode $B_{2'}$ picture earlier than $I_{3'}$ picture in the display order, $I_{3'}$ picture, $I_3$ picture, $P_6$ picture, $P_9$ picture, $P_{12}$ picture, and $P_{15}$ picture that belong to a GOP earlier by one GOP than the GOP to which I3' picture belongs successively become necessary. Thus, in this case, the buffer amount becomes N/M+M+1=9 pictures.

Thus, when the target reproduction frame is moved to an adjacent frame earlier or later by one frame than the target reproduction frame in the display order, the buffer amount becomes nine pictures.

1-5-2. Example of Target Frame Buffer Update Pattern

In the system according to an embodiment of the present invention, for the frame buffer, a buffer update pattern that allows adjacent pictures earlier and later by one frame than a target reproduction frame in the display order to be displayed with a fixed delay is created. In other words, frames earlier and later by one frame than a target reproduction frame decoded and stored in the buffer are usually decoded and stored in the buffer. In addition, frames necessary to continue the reverse reproduction operation and frames necessary to continue the forward reproduction operation are usually decoded and stored in the buffer. Such patterns on the buffer are created in all the cases of which the target reproduction frame is moved for one frame.

In this state, when the target reproduction frame is moved for one frame and the frame is updated, data to be newly decoded are usually one frame regardless of whether the reproduction direction is the forward direction or the reverse direction. Thus, the variable speed reproduction within 1× speed can be accomplished regardless of whether the reproduction direction is the forward direction or the reverse direction.

In this state, a reproduction output result can be obtained with a fixed delay in the range from 1× speed reproduction operation in the reveres direction to 1× speed reproduction operation in the forward direction.

Figure 12:
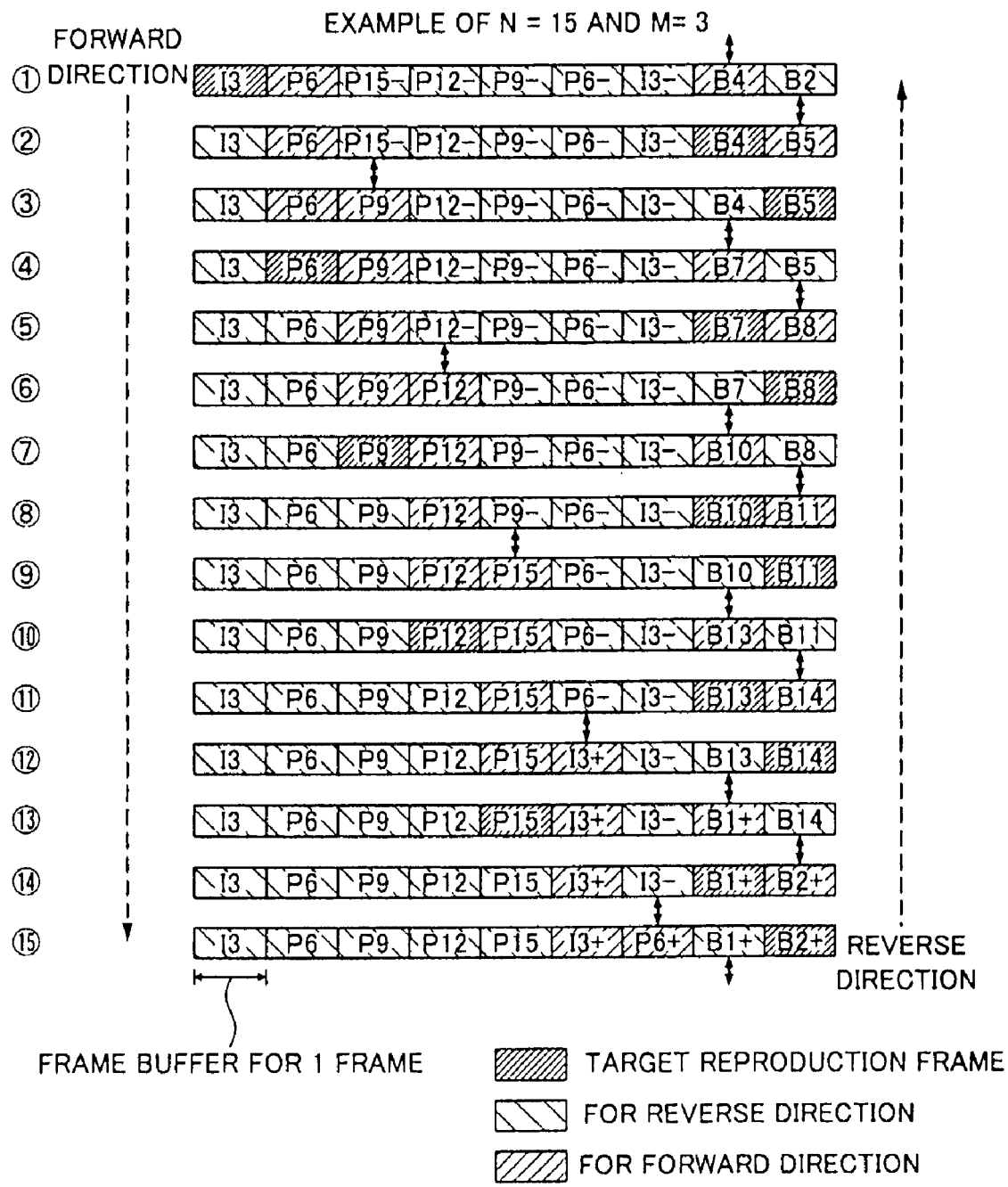
FIG. 12 is a schematic diagram showing an example of an update pattern of a target frame buffer of the system according to an embodiment of the present invention.

FIG. 12 shows examples of target frame buffer update patterns created on the basis of the foregoing concept. The examples shown in FIG. 11 are based on a long GOP with (N=15, M=3). Since one GOP is composed of 15 pictures (frames), there are 15 patterns. As represented in each line of FIG. 12, in the state that a frame corresponding to a target reproduction frame has been stored in the frame buffer, when the target reproduction frame is moved in any direction, only one frame is updated and a variable speed reproduction operation can be performed within 1× speed in the forward direction and the reverse direction by one 1× speed decoder.

In FIG. 12, I, P, and B represent frames based on an I picture, a P picture, and a B picture, respectively. Their suffixes represent display order numbers in the current GOP. Frames of pictures that belong to a reference GOP (current GOP) are not assigned a sign. A frame of a picture that belongs to a GOP earlier by one GOP than the current GOP is identified by a minus sign (−). This GOP is referred to as GOP(−). A frame of a picture that belongs to a GOP later by one GOP than the current GOP is identified by a plus sign (+). This GOP is referred to as GOP(+).

In the update patterns shown in FIG. 12, the downward direction represents the forward reproduction operation, whereas the upward direction represents the reverse reproduction operation. In other words, when a pattern is moved downward for one line in FIG. 12, the target reproduction frame is moved for one frame. When a pattern is moved upward for one line in FIG. 12, the target reproduction frame is returned for one frame. In addition, the update patterns shown in FIG. 12 are recursive. In other words, when the target reproduction frame is returned from the pattern in the first line for one line, the target reproduction frame is returned to the frame pattern in the 15-th line.

In the frame buffer update patterns shown in FIG. 12, the first line represents an example of a pattern of which the target reproduction frame is frame "I3". To move the target reproduction frame from "I3" for one frame in the forward direction, frame "B4" and frame "P6" become necessary. To return the target reproduction frame for one frame in the reverse direction, frame "B2", frame "P15−", frame "P12−", frame "P9−", frame "P6−", and frame "I3−" become necessary.

The second line represents an example of a pattern of which the target reproduction frame is frame "B4". To move the target reproduction frame from "B4" for one frame in the forward direction, frame "B5" and frame "P6" become necessary. To return the target reproduction frame for one frame in the reverse direction, frame "I3", frame "P15−", frame "P12−", frame "P9−", frame "P6−", and frame "I3−" become necessary.

The third line represents an example of a pattern of which the target reproduction frame is frame "B5". To move the target reproduction frame from "B5" for one frame in the forward direction, frame "P6" and frame "P9" become necessary. To return the target reproduction frame for one frame in the reverse direction, frame "B4", frame "I3", frame "P12−", frame "P9−", frame "P6−", and frame "I3−" become necessary.

The fourth line represents an example of a pattern of which the target reproduction frame is frame "P6". To move target reproduction frame from "P6" for one frame in the foreword direction, frame "B7" and frame "P9" become necessary. To return the target reproduction frame for one frame in the reverse direction, frame "B5", frame "I3", frame "P12−", frame "P9−", frame "P6−", and frame "I3−" become necessary.

The fifth line represents an example of a pattern of which the target reproduction frame is frame "B7". To move target reproduction frame from "B7" for one frame in the foreword direction, frame "B8" and frame "P9" become necessary. To return the target reproduction frame for one frame in the reverse direction, frame "P6", frame "I3", frame "P12−", frame "P9−", frame "P6−", and frame "I3−" become necessary.

The sixth line represents an example of a pattern of which the target reproduction frame is frame "B8". To move target reproduction frame from "B8" for one frame in the foreword direction, frame "P9" and frame "P12" become necessary. To return the target reproduction frame for one frame in the reverse direction, frame "B7", frame "P6", frame "I3", frame "P9−", frame "P6−", and frame "I3−" become necessary.

The seventh line represents an example of a pattern of which the target reproduction frame is frame "P9". To move target reproduction frame from "P9" for one frame in the foreword direction, frame "B10" and frame "P12" become necessary. To return the target reproduction frame for one frame in the reverse direction, frame "P6", frame "I3", frame "P9−", frame "P6−", and frame "I3−" become necessary.

The eighth line represents an example of a pattern of which the target reproduction frame is frame "B10". To move target reproduction frame from "B10" for one frame in the foreword direction, frame "B11" and frame "P12" become necessary. To return the target reproduction frame for one frame in the reverse direction, frame "P9", frame "P6", frame "I3", frame "P9−", frame "P6−", and frame "I3−" become necessary.

The ninth line represents an example of a pattern of which the target reproduction frame is frame "B11". To move target reproduction frame from "B11" for one frame in the foreword direction, frame "P12" and frame "P15" become necessary. To return the target reproduction frame for one frame in the reverse direction, frame "B10", frame "P9", frame "P6", frame "I3", frame "P6−", and frame "I3−" become necessary.

The tenth line represents an example of a pattern of which the target reproduction frame is frame "P12". To move target reproduction frame from "P12" for one frame in the foreword direction, frame "B13" and frame "P15" become necessary. To return the target reproduction frame for one frame in the reverse direction, frame "B11", frame "P9", frame "P6", frame "I3", frame "P6−", and frame "I3−" become necessary.

The eleventh line represents an example of a pattern of which the target reproduction frame is frame "B13". To move target reproduction frame from "B13" for one frame in the foreword direction, frame "B14" and frame "P15" become necessary. To return the target reproduction frame for one frame in the reverse direction, frame "P12", frame "P9", frame "P6", frame "I3", frame "P6−", and frame "I3−" become necessary.

The twelfth line represents an example of a pattern of which the target reproduction frame is frame "B14". To move target reproduction frame from "B14" for one frame in the foreword direction, frame "P15" and frame "I3+" become necessary. To return the target reproduction frame for one frame in the reverse direction, frame "B13", frame "P12", frame "P9", frame "P6", frame "I3", and frame "I3−" become necessary.

The thirteenth line represents an example of a pattern of which the target reproduction frame is frame "P15". To move target reproduction frame from "P15" for one frame in the foreword direction, frame "B1+" and frame "I3+" become necessary. To return the target reproduction frame for one frame in the reverse direction, frame "B14", frame "P12", frame "P9", frame "P6", frame "I3", and frame "I3−" become necessary.

The fourteenth line represents an example of a pattern of which the target reproduction frame is frame "B1+". To move target reproduction frame from "B1+" for one frame in the foreword direction, frame "B2+" and frame "I3+" become necessary. To return the target reproduction frame for one frame in the reverse direction, frame "P15", frame "P12", frame "P9", frame "P6", frame "I3", and frame "I3−" become necessary.

The fifteenth line represents an example of a pattern of which the target reproduction frame is frame "B2+". To move target reproduction frame from "B2+" for one frame in the foreword direction, frame "I3+" and frame "P6+" become necessary. To return the target reproduction frame for one frame in the reverse direction, frame "B1+", frame "P15", frame "P12", frame "P9", frame "P6", and frame "I3" become necessary.

Thus, in the update patterns of the frame buffer exemplified in FIG. 12, between update patterns of each frame, only one frame is updated. Next, with reference to several examples, update patterns of the frame buffer will be described more specifically.

As a first example, the case of which the target reproduction frame is frame "P6", which is a P picture, will be described. In this case, in the reproduction speed range within 1× speed in the forward direction and the reverse direction, after the target reproduction frame, frame "P6" and adjacent frames "B5" and "B7" earlier and later by one frame than frame "P6" likely become a new target reproduction frame.

In the state that the target reproduction frame is frame "P6" and that frames that have been decoded corresponding to the target frame buffer pattern created based on the target reproduction frame have been stored in the frame buffer (refer to the pattern in the fourth line shown in FIG. 12), the target reproduction frame, "P6", and the adjacent frames, "B5" and "B7", earlier and later by one frame than the target reproduction frame, "P6", have been decoded and stored in the frame buffer.

In this state, when the target reproduction frame is moved to frame "B5" or frame "B7", frames based on the new target frame buffer pattern corresponding to the moved target reproduction frame are decoded and stored in the frame buffer.

Except for the areas for these data in the frame buffer, data that have been already stored are kept. In the example of the pattern in the fourth line shown in FIG. 12, when the target reproduction frame is "P6", frame "P6", frame "I3", frame "P9", frame "B5", and frame "B7" that belong to the same GOP as frame "P6", and frame "I3−", frame "P6−", frame "P9−", and frame "P12−" that belong to a GOP earlier by one GOP than the GOP to which frame "P6" belongs are stored in the frame buffer.

In the case that the target reproduction frame is frame "P6", when the target reproduction frame is moved for one frame in the forward direction, frame "B7" becomes a new target reproduction frame. After one frame, frame "B7" and adjacent frames "P6" and "B8" earlier and later by one frame than frame "B7" likely become a new target reproduction frame.

When the reproduction speed is within 1× speed in the forward direction and the reverse direction, the same frame may be successively output at timing of two frames. In this case, at timing of the next frame, the target reproduction frame is not changed.

Among these frames, since frame "P6" is the current target reproduction frame, frame "P6" has been already stored in the frame buffer. To decode frame "P8", frame "P6" and frame "P9" become necessary. Since frame "P6" and frame "P9" have been used to decode frame "B7", they have been already stored in the frame buffer. Frame "B8" is decoded with frame "P6" and frame "P9".

When the target reproduction frame is moved to frame "B7", since frame "B5" that is an adjacent frame of frame "P6", which was a target reproduction frame, in the reverse direction in the display order, becomes unnecessary, frame "B5" is removed. In the area for frame "B5", which has been removed from the frame buffer, frame "B8" that has been newly decoded is stored. In this manner, the frame buffer is updated.

When the target reproduction frame is returned for one frame in the reverse direction, frame "B5" becomes a new target reproduction frame. After one frame, frame "B5", frame "B4", and "P6" likely become a new target reproduction frame. Since frame "P6" is the current target reproduction frame, frame "6" has been already stored in the frame buffer. To decode frame "B4", frame "I3" and frame "P6" become necessary. Frame "I3" is stored in the frame buffer. Frame "B4" is decoded with frame "I3" and frame "P6".

On the other hand, when the target reproduction frame is moved from frame "P6" to frame "B5", since frame "B7", which is an adjacent frame of frame "P6" in the forward direction become unnecessary, frame "B7" is removed. In the area for frame "B7" that has been removed from the frame buffer, frame "B4" that has been newly decoded is stored. In this manner, the frame buffer is updated.

Thus, when target reproduction frame is moved from a "P6" for one frame in the forward direction, only one frame from frame "B5" to frame "B8" is updated. When the target reproduction frame is returned from "P6" for one frame in the reverse direction, only one frame from frame "B7" to frame "B4'" is updated.

As a second example, the case that the target reproduction frame is frame "B7", which is a B picture, will be described. In this case, in the reproduction speed range within 1× speed in the forward direction and the reverse direction, after one frame, frame "B7" and adjacent frames "P6" and "B8" earlier and later by one frame than frame "B7" likely become a new target reproduction frame.

In the state that the target reproduction frame is frame "B7" and that frames decoded according to a target frame buffer pattern created based on the target reproduction frame have been already stored in the frame buffer (refer to the pattern in the fifth line shown in FIG. 12), the target reproduction frame, "B7", and adjacent frame "P6" and frame "B8" earlier and later by one frame than frame "P6" have been already decoded and stored in the frame buffer.

In this state, when the target reproduction frame is moved to frame "P6" or frame "P8", frames based on a new target frame buffer pattern corresponding to the moved target reproduction frame are decoded and stored in the frame buffer.

Except for the areas for these frames in the frame buffer, data that have been already stored are kept. In other words, in the example of the pattern in the fifth line shown in FIG. 12, when the target reproduction frame is frame "B7", frame "B7", frame "I3", frame "P9", and frame "B8" that belong to the same GOP as the GOP to which frame "B7" belongs, and frames "I3-", frame "P6-", frame "P9-", and frame "P12-" that belong to a GOP earlier for one GOP than the GOP to which frame "B7" belongs are stored in the frame buffer.

In the case that the target reproduction frame is frame "B7" and moved for one frame in the forward direction, frame "B8" becomes a new target reproduction frame. After one frame, frame "B8" and adjacent frames "B7" and "P9" earlier and later by one frame than frame "B8" in the display order likely become a new target reproduction frame.

Among these frames, since frame "B7" is the current target reproduction frame, frame "B7" has been already stored in the frame buffer. To decode frame "B8", frame "P6" and frame "P9" become necessary. Since frame "P6" and frame "P9" are frames that become necessary to decode frame "B7", frames "P6" and frame "P9" have been already stored in the frame buffer. Frame "B8" is decoded with frame "P6" and frame "P9". In addition, frame "P9" has been already stored in the frame buffer.

In this case, since frame "P6", which is an adjacent frame of frame "B7" in the reverse direction in the display order, is used to decode frame "B8", frame "P6" is not removed. In addition, frame "P12" that is used when the target reproduction frame is moved for one frame in the forward direction is decoded with frame "P9". The latest frame, "P12-", in the display order, in frames that belong to the earliest GOP in the buffer memory, is removed and frame "P12" that has been decoded is stored in the buffer memory.

When the target reproduction frame is returned for one frame in the reverse direction, frame "P6" becomes a new target reproduction frame. After one frame, frame "P6", frame "B5", and frame "B7" likely become a new target reproduction frame. Since frame "B7" is the current target reproduction frame, frame "B7" has been already stored in the frame buffer. To decode frame "B5", frame "I3" and frame "P6" become necessary. Frame "I3" is stored in the frame buffer. Frame "B5" is decoded with frame "I3" and frame "P6".

When the target reproduction frame is moved from frame "B7" to frame "P6", frame "B8", which is an adjacent frame of frame "B7" in the forward direction, become unnecessary, frame "B8" is removed. In the area for frame "B8", which has been removed from the frame buffer, frame "B5" that has been newly decoded is stored. In this manner, the frame buffer is updated.

Thus, when the target reproduction frame is moved from frame "B7" for one frame in the forward direction, only one frame from frame "P12-" to frame "P12" is updated. When the target reproduction frame is returned from frame "B7" for one frame in the reverse direction, only one frame from frame "B8" to frame "B5" is updated.

As a third example, the case that the target reproduction frame is frame "I3", which is an I picture, will be described. In this case, in the reproduction speed range within 1× speed in the forward direction and the reverse direction, after one frame, frame "I3" and adjacent frames "B2" and "B4" earlier and later by one frame than frame "I3" in the display order likely become a new target reproduction frame.

In the case that the target reproduction frame is frame "I3" and that data decoded according to a target frame buffer pattern created based on the target reproduction frame has been already stored in the frame buffer (refer to the pattern on the first line shown in FIG. 12), the target reproduction frame, "I3", and adjacent frames "B2" and frame "B4" earlier and later by one frame than frame "I3" have been already decoded and stored in the frame buffer.

In this state, when the target reproduction frame is moved to frame "B2" or frame "B4", frames based on a new target frame buffer pattern corresponding to the moved target reproduction frame are decoded and stored in the frame buffer.

Except for the areas for these data in the frame buffer, data that have been already stored are kept. In the example of the pattern in the first line shown in FIG. 12, when the target reproduction frame is "I3", frame "I3", frame "P6", frame "B2", and frame "B4" that belong to the same GOP as the GOP to which frame "I3" belongs, and frame "I3-", frame "P6-", frame "P9", frame "P12-", and frame "P15" that belong to a GOP earlier by one GOP than the GOP to which frame "P6" belongs are stored in the frame buffer.

When the target reproduction frame is frame "I3" and moved for one frame in the forward direction, frame "B4" becomes a new target reproduction frame. After one frame, frame "B4" and adjacent frames "I3" and "B5" earlier and later by one frame than frame "B4" likely become a new target reproduction frame.

Among these frames, since frame "I3" is the current target reproduction frame, it has been already stored in the frame buffer. To decode frame "B5", frame "I3" and frame "B6" become necessary. Since frame "P6" has been used to decode frame "B4", it has been already stored in the frame buffer. Frame "B5" is decoded with these frame "I3" and frame "P6".

In this case, since frame "B2", which is the target reproduction frame in the reverse direction of frame "I3", become unnecessary, frame "B2" is removed. In the area for frame "B2", which has been removed from the frame buffer, frame "B5" that has been decoded is stored. In this manner, the frame buffer is updated.

When the target reproduction frame is returned for one frame in the reverse direction, frame "B2" becomes a new target reproduction frame. After one frame, frame "B2", frame "B1", and frame "I3" likely become a new target reproduction frame. Since frame "I3" is the current target reproduction frame, frame "I3" has been already stored in the frame buffer. To decode frame "B1", frame "I3" and frame "P15-" that belongs to a GOP earlier by one GOP than the GOP to which frame "I3" belongs become necessary. Frame "B1" is decoded with these frames, "P15-" and "I3".

On the other hand, when the target reproduction frame is moved from frame "I3" to frame "B2", since frame "B4", which is an adjacent frame of frame "I3" in the forward direction, become unnecessary, frame "B4" is removed. In the area for frame "B4", which has been removed from the frame buffer, frame "B1" that has been newly decoded is stored. In this manner, the frame buffer is updated.

Thus, when the target reproduction frame is moved from frame "I3" for one frame in the forward direction, only one frame from frame "B2" to frame "B5" is updated. Likewise, when the target reproduction frame is returned from frame "I3" for one frame in the reverse direction, only one frame from frame "B4" to frame "B1" is updated.

As described above, when a target reproduction frame is moved to another frame, one frame stored in the buffer memory is removed. In the area for the frame that has been removed, one new frame is decoded and stored. In this manner, the buffer memory is updated. At this point, a frame removed from the buffer memory can be decided based on the following rules.

(1) A frame of a B picture that is neither a target reproduction frame nor a frame adjacent thereto is removed.
(2) Unless there is a frame of a B picture to be removed based on the foregoing rule (1), a frame of an I picture or a P picture that has been stored in the buffer memory and that satisfies the following rule (2a) or (2b) is removed.
(2a) When the target reproduction frame is moved in the forward direction, the frame is the last I or P picture that belongs to a GOP that is the most apart in the reverse direction from the GOP to which the target reproduction frame belongs.
(2b) When the target reproduction frame is moved in the reveres direction, the frame is the last I or P picture that belongs to a GOP that is the most apart in the forward direction from the GOP to which the target reproduction frame belongs.

As described above, in the case that data are stored in the buffer memory based on a buffer memory update pattern of the system according to this embodiment of the present invention, regardless of whether the current target reproduction frame is a frame of an I picture, a frame of a P picture, or a frame of a B picture, when the target reproduction frame is moved for one frame in any direction, data of only one frame are updated in the buffer memory. Thus, the variable speed reproduction operation within 1× speed in the forward direction and the reverse direction can be executed with a fixed delay by one 1× speed decoder.

In the foregoing examples, the cases of which the current target reproduction frame is each of an I picture, a P picture, and a B picture that compose a GOP were described. However, in the case that another frame that was omitted in the foregoing description is the current target reproduction frame, when it is moved for one frame in any direction, data of only one frame are updated in the buffer memory.

1-5-3. Flow of Process of Creating Target Frame Buffer Pattern

Next, with reference to a flow chart shown in FIG. 13, a method of creating an example of the foregoing target frame buffer pattern will be described. In the following description, it is assumed that a target frame (called the current frame) is a frame of a B picture.

Figure 14A:
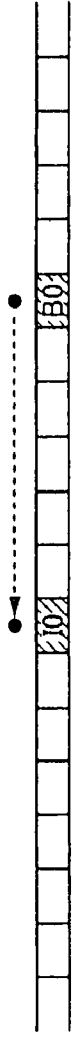
FIG. 14A to FIG. 14F are schematic diagrams describing a method of creating an example of a target frame buffer pattern.
Figure 15A:
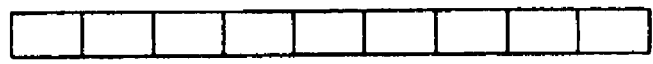
FIG. 15A to FIG. 15F are schematic diagrams describing a method of creating an example of a target frame buffer pattern.

At step S10, an I picture ($I_0$) is obtained from the current GOP to which the current frame belongs. As exemplified in FIG. 14A, an I picture is retrieved from the current GOP, starting from the picture corresponding to the current frame in the reverse direction in the order on the record medium. In this stage, no frame of the target frame buffer pattern has been decided (refer to FIG. 15A).

Figure 14B:
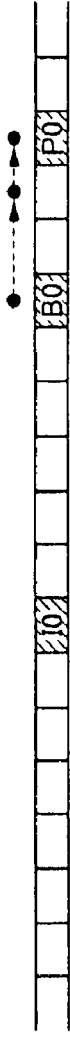
Figure 15B:
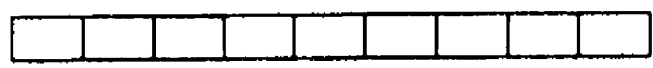

When the top I picture ($I_0$) picture has been obtained from the current GOP, the flow advances to step S11. At step S11, an I picture or a P picture ($P_0$) that is far from the current frame for two or more frames is retrieved from the current GOP in the forward direction in the order on the record medium, starting from the picture corresponding to the current frame (refer to FIG. 14B). In this stage, no frame of the target frame buffer pattern has been decided (refer to FIG. 15B).

Figure 14C:
Figure 15C:

At step S12, an I picture and/or a P picture is retrieved in the range from picture ($I_0$) to picture ($P_0$) obtained at step S10 and step S11, respectively. As exemplified in FIG. 14C, picture ($I_0$) retrieved at step S10 is decided as a frame used in the target frame buffer pattern. In addition, the next P picture (P) is retrieved from the current GOP, starting from picture ($I_0$) in the forward direction in the order on the record medium. The retrieved P picture is decided as a frame used for the target frame buffer pattern. In this manner, frames of the current GOP used for the target frame buffer pattern are successively decided based on the retrieved P or I picture (refer to FIG. 15C).

Figure 14D:
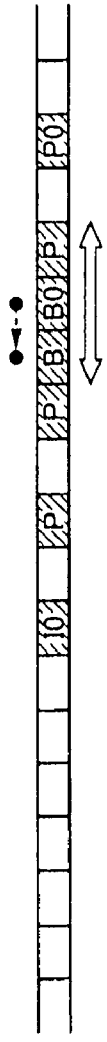
Figure 15D:
Figure 15E:

When frames of an I picture and a P picture of the current GOP have been decided as frames used for the target frame buffer pattern at step S12, the flow advances to step S13. At step S13, a B picture is retrieved in the range from a frame earlier by one frame than the current frame to a frame later by one frame than the current frame in the order on the record medium (refer to FIG. 14D). The frame of the retrieved B picture is decided as a frame of the current GOP used for the target frame buffer pattern (refer to FIG. 15D).

Namely, at step S11 and step S12, a frame of an I picture and/or a frame of a P picture used to decode a B picture that is earlier by one frame than the current frame and later by one frame than the current frame is decided as a frame used for the target frame buffer pattern. At step S13, a frame of a B picture decoded with a frame of the I picture/or a frame of a P picture that has been decided is decided as a frame used for the target frame buffer pattern.

Figure 14E:
Figure 14F:
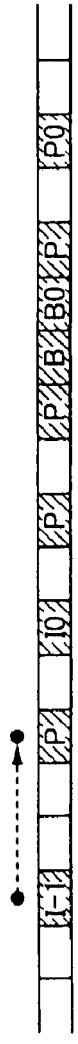
Figure 15F:

When all frames used for the target frame buffer pattern of the current GOP have been decided at step S13, the flow advances to step S14. At step S14, the top I picture ($I_{-1}$) is retrieved from a GOP earlier by one GOP from the current GOP (refer to FIG. 14E). For example, an I picture is retrieved in the reverse direction in the order on the record medium, starting from the top I picture ($I_0$) of the current GOP. A P picture is retrieved in the forward direction in the order on the record medium, starting from the retrieved I picture ($I_{-1}$) (referrer to FIG. 14F). A frame of an I picture and/or a frame of a P picture of the GOP earlier by one GOP than the current GOP is decided as a frame used for the target frame buffer pattern (refer to FIG. 15F).

Steps S14 and S15 are repeated until the buffer memory is filled (at step S16).

The position and type (I picture, P picture, or B picture) of each picture recorded on the record medium can be obtained by referencing the picture pointer file described with reference to FIG. 10. When the system of this embodiment or a high level system issues a reproduction command for a particular frame, the CPU 14 retrieves the particular frame as the target reproduction frame from the picture pointer file for the current GOP to which the target reproduction frame belongs and obtains the position of an I picture of the current GOP. As described above, the picture pointer file describes picture type, flag denoting whether or not the current picture is the top picture of the current GOP, picture size information, and top address. Thus, a desired picture can be retrieved from the record medium based on these information.

After the target frame buffer pattern has been decided based on the target reproduction frame and the frame buffer has been filled with decoded frames based on the target frame buffer pattern, in the process as described with reference to FIG. 12, the reproduction operation is performed within 1× speed in the forward direction and the reverse direction with a predetermined fixed delay according to the reproduction command.

In this example, it was assumed that the target reproduction frame was a B picture. Instead, the process described in the flow chart shown in FIG. 13 can be applied when the current frame is an I picture or a P picture.

Figure 13:
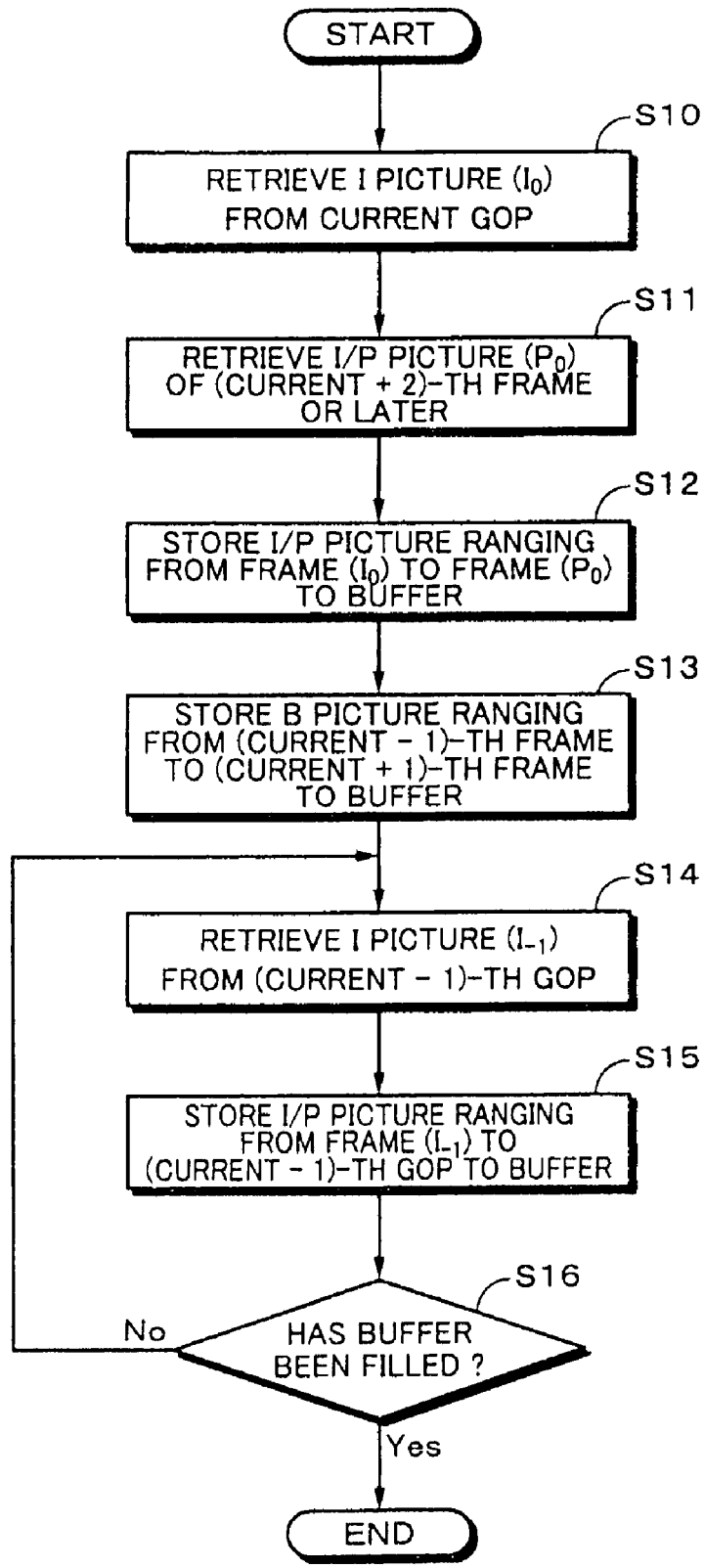
FIG. 13 is a flow chart showing a method of creating an example of a target frame buffer pattern.

A target frame buffer pattern is created for the target reproduction frame in the process of the flow chart shown in FIG. 13 with a frame according to a reproduction command issued from the system or the high level system. This process is performed for example whenever a target reproduction frame is designated. Instead, a target frame buffer pattern may be created for all frames of a GOP when a first target reproduction frame is designated. The created target frame buffer pattern is stored for example in the RAM 36.

Instead, when the structure of a GOP of a clip to be reproduced is known, the process in the flow chart shown in FIG. 13 may be performed for each picture that belongs to the GOP such that the frame buffer update pattern shown in FIG. 12 is pre-created. Instead, when a structure of a GOP applied to the reproduction apparatus 1 has been decided, an update pattern may be pre-created and stored in the ROM 35.

The CPU 14 references an update pattern for an output frame according to a reproduction command within 1× speed in the forward direction or the reverse direction for the operation section 15, designates a picture to be read from the optical disc 10 at timing of each frame, and updates the frame buffer.

1-5-4. Reproduction Control Operation Based on Frame Buffer Update Pattern

Figure 16:
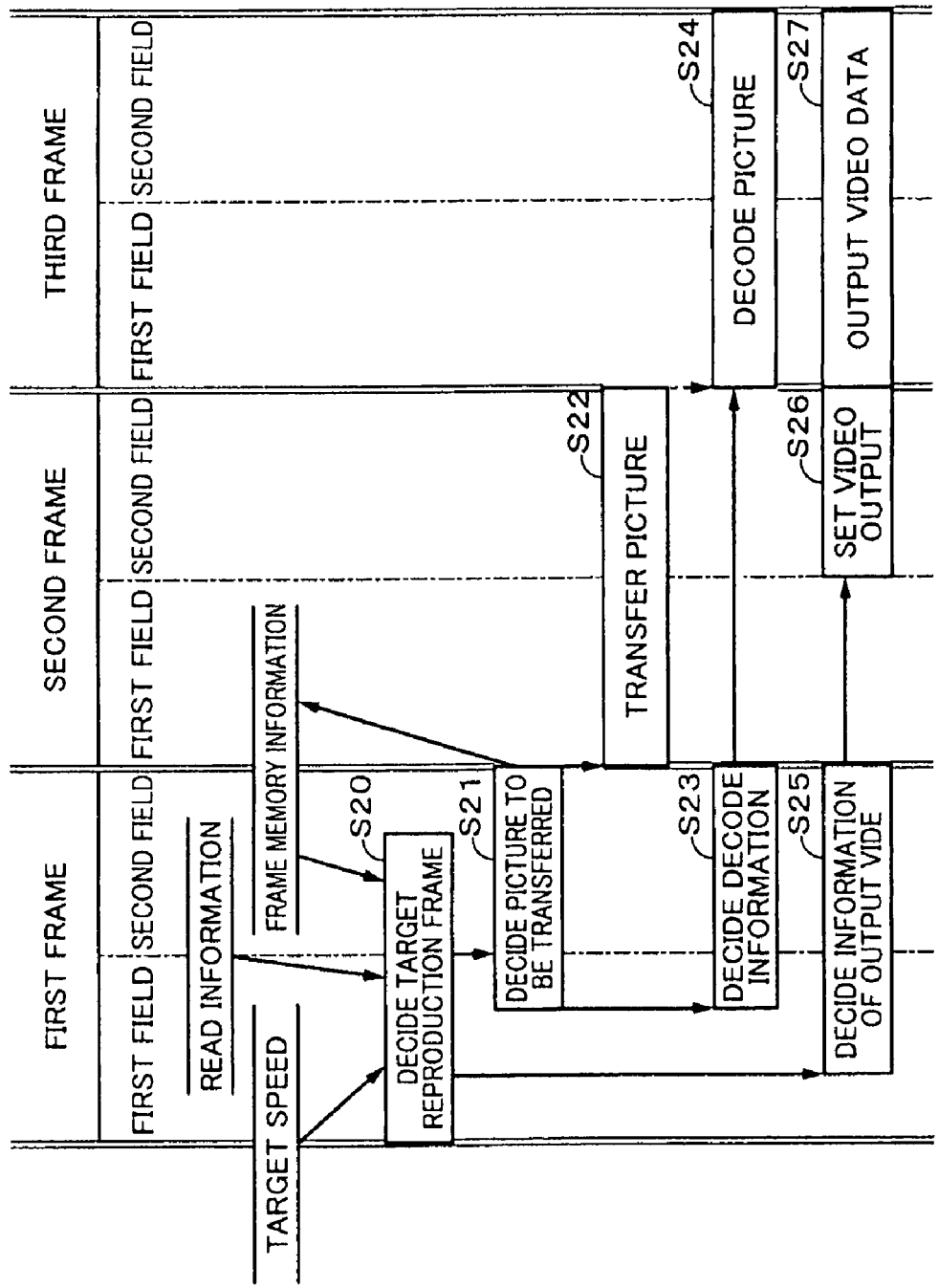
FIG. 16 is a schematic diagram showing an outline of a synchronous control by the system according to an embodiment of the present invention.

Next, a reproduction control operation based on a frame buffer update pattern will be described. The reproduction control is performed for each frame in synchronization with timing of each frame. FIG. 16 shows an outline of a synchronous control performed by the system according to an embodiment of the present invention. In the example shown in FIG. 16, video data are decoded for one frame at intervals of three frames. As video data are decoded, video data for one frame are synchronously output from the frame buffer.

At a first frame, a target reproduction frame is decided based on frame buffer information of a frame that is currently stored in the frame buffer (the frame buffer information is obtained by the CPU 14), read information of the disc drive 11, and target speed information (at step S20). The read information is information about a picture that has been already read from the optical disc 10 and stored in the cache memory 12 of the disc drive 11. On the other hand, the target speed information is information that represents a reproduction speed and a reproduction direction that are supplied to the CPU 14 corresponding to an operation for the operation section 15, a command issued from a high level application, or the like.

After the target reproduction frame has been decided, a picture transferred to the decoder 22 is decided (at step S21). In other words, as the target reproduction frame has been decided, a picture to be decoded is decided based on a frame buffer update pattern described with reference to FIG. 12.

In the example of the pattern in the fourth line shown in FIG. 12, when the reproduction direction is the forward direction, a new target reproduction frame corresponding to the current target reproduction frame, "P6", is decided as one of frame "B7" and frame "P6". Whether frame "B7" or frame "P6" is decided as the new target reproduction frame depends just on the target speed information, designation timing, and so forth. In this example, it is assumed that frame "B7" has been decided as the new target reproduction frame.

Thereafter, the frame buffer information of the fourth line is compared with the frame buffer information of the new target reproduction frame. As a result, a frame to be newly decoded and a frame to be removed are extracted. In this example of which frame "B7" is the new target reproduction frame, the frame buffer information of the fourth line is compared with the frame buffer information of the fifth line. As a result, it is clear that frame "B5" becomes unnecessary and frame "B8" becomes necessary to have been decoded.

When a picture to be transferred has been decided at step S21, at timing of the second frame, the picture is transferred to the decoder 22 (at step S22). For example, the CPU 14 requests the disc drive 11 to read the decided picture from the optical disc 10. Accordingly, the disc drive 11 reads the picture (in this example, a picture corresponding to frame "B8") from the optical disc 10. The picture that has been read is transferred to the decoder 22. In addition, when there is another frame necessary to decode the picture that has been read, the frame is read from the frame buffer and transferred to the decoder 22.

In this example of which frame "B8" is decoded, a picture corresponding to frame "B8" and frames "P6" and "P9" used to decode frame "B8" are transferred to the decoder 22.

Specifically, as described above, a decided picture is transferred by accessing the cache memory 12 of the disc drive 11 and transferring the picture from the cache memory 12 to the decoder 22 based on the DMA (Directly Memory Access) not through the CPU 14.

A picture is transferred from the disc drive 11 to the decoder 22 in synchronization with timing of the second frame (at step S22). As the picture to be transferred has been decided at step S21, decode information about the picture is decided (at step S23). For example, a parameter that has been extracted from header information of the decided picture and that is necessary to decode the picture and information about another frame necessary to decode the picture are decided as decode information. These decided decode information is transferred to the decoder 22.

The decoder 22 starts decoding the picture transferred at step S22 based on the decode information transferred as step S23 in synchronization with timing of the next third frame (at step S24). The decoded picture (frame) is written to a predetermined bank of the frame buffer. In this manner, the frame buffer is updated. In the example of the fourth line shown in FIG. 12, data of frame "B8" that has been decoded are overwritten to a bank for frame "B5" in the buffer memory (refer to the fifth line of FIG. 12).

When the target reproduction frame has been decided at step S20, information of video data to be output is decided (at step S25). In the example of the fourth line shown in FIG. 12, frame "P6" is decided as output video data. Information about the decided output video data is transferred to the output data control section 23. The output data control section 23 sets a video output based on the received information before timing of the third frame (at step S26). Based on the video output that has been set, frame "P6" is output in synchronization with timing of the third frame (at step S27).

The reproduction operation within 1× speed in the forward direction can be performed by controlling whether or not to move the target reproduction frame to the next frame based on the reproduction speed information supplied from a high level application for example at step S20. When the reproduction operation is performed at ½× speed in the forward direction, only one frame is updated at timing of every two frames. This operation can be performed by updating the target reproduction frame every two frames. Unless the target reproduction frame is updated, the process is performed based on the same frame buffer pattern as that in the immediately preceding process. Thus, the same frame as the immediately preceding frame is output. At this point, it is preferred that the access operation of the reproduction apparatus 1 to the optical disc 10 and the decode operation of the decoder 22 be stopped.

In the foregoing example, the process in the case that the reproduction is the forward direction was described. The same process is performed in the case that the reproduction direction is the reverse direction. At a first frame, a target reproduction frame is decided based on frame buffer information, read information, and target speed information (at step S20). After the target reproduction frame has been decided, a picture to be transferred to the decoder 22 is decided (at step S21). In the example of the fourth line shown in FIG. 12, since the reproduction direction is the reverse direction, the target reproduction frame is decided as frame "B5" or frame "P6". In this example, it is assumed that the target reproduction frame is decided as frame "B5". In addition, the frame buffer information of the fourth line is compared with the frame buffer information of the third line of which the target reproduction frame is an output frame. As a result, it is clear that frame "B7" becomes unnecessary and frame "B4" becomes necessary to have been decoded.

When a picture to be transferred has been decided at step S21, the picture is transferred to the decoder 22 in synchronization with timing of the second frame (at step S22). At this point, when there is another picture necessary to decode the current picture, the other picture is read from the frame buffer and transferred to the decoder 22. In this example of which frame "B4" is decoded, frames "I3" and "P6" used to decode frame "B4" are also transferred to the decoder 22. As shown in the fourth line of FIG. 12, frames "I3" and "P6" have been already stored in the frame buffer.

After a picture to be transferred has been decided at step S21, decode information about the picture is decided (at step S23). The decided decode information is transferred to the decoder 22. The decoder 22 starts decoding the picture transferred at step S22 based on the decode information transferred at step S23 in synchronization with timing of the third frame (at step S24). The decoded picture (frame) is written to a predetermined bank of the frame buffer. In this manner, the frame buffer is updated. In the example of the fourth line of FIG. 12, data of frame "B4" that has been decoded is overwritten to the bank for frame "B7" in the frame buffer (refer to the third line of FIG. 12).

When the target reproduction frame has been decided at step S20, information about video data to be output is decided (at step S25). In the example of the fourth line of FIG. 17, frame "P6" is decided as output video data. Information about the decided output video data is transferred to the output data control section 23. The output data control section 23 sets a video output based on the transferred information before timing of the third frame (at step S26). Based on the video output that has been set, frame "P6" is output in synchronization with timing of the third frame (at step S27).

Regardless of whether the reproduction direction is the forward direction or the reverse direction, steps S20 to S27 are successively executed at timing of each frame. In other words, the target reproduction frame is decided in synchronization with timing of the first frame at step S20. A new target reproduction frame corresponding to the output frame is decided in synchronization with timing of the next second frame.

The new target reproduction frame is transferred from the disc drive 11 to the decoder 22 in synchronization with timing of the next third frame. Thus, this transfer process does not interfere with the immediately preceding process. Likewise, the decode process of the decoder 22 synchronizes with a fourth frame (not shown), the decode process does not interfere with the immediately preceding process.

Thus, according to this embodiment of the present invention, the variable speed reproduction operation from 1× speed in the forward direction to 1× speed in the reverse direction with a fixed delay according to commands designating a reproduction speed and a reproduction direction free of a drop of frames can be accomplished by one 1× speed decoder.

In the sequence shown in FIG. 16, after a target reproduction frame has been decided at step S20 until a video output is performed with a fixed delay at step S27, it is necessary to perform a data transfer process at step S22 and a decode process at step S24 in one picture/frame period in average. In other words, as long as the transfer process at step S22 and the decode process at step S24 each are performed within one picture/frame period in average, it is not necessary to fix their process periods to one frame period.

When pictures are decoded by one 1× speed decoder and the reproduction operation within 1× speed in the forward direction and the reverse direction with a fixed delay is performed based on the foregoing target frame buffer pattern, whenever a target reproduction frame is moved, one frame is decoded and one frame is removed from the buffer memory. Thus, the data transfer process at step S22 and the decode process at step S24 each are performed in one picture/frame period. As a result, they are performed in a period of three frames as shown in FIG. 16.

2. Another Embodiment of Present Invention

Next, another embodiment of the present invention will be described. In this embodiment, a reproduction apparatus is provided with two 1× speed decoders. While one decoder decodes a clip that is being reproduced (hereinafter, this clip is referred to as a current reproduction clip), the other decoder pre-decodes a clip to be reproduced next. In the following description, the decoder that decodes the current reproduction clip is referred to as the output decoder, whereas the decoder that decodes a clip that to be reproduced and output next is referred to as the other decoder.

At this point, the clip to be reproduced and output next (hereinafter, this clip is referred to as the target reproduction clip) is decided based on the reproduction position (decode position) of the current reproduction clip. In a picture of the target reproduction clip, the foregoing target frame buffer update pattern is created based on the first output frame as the target reproduction frame. The other decoder decodes the frame of the target reproduction clip based on the created target frame buffer update pattern and stores the decoded frame.

The target reproduction clip is decided for example based on the relationship of the reproduction position of the current reproduction clip and the nearly center position of the time length of the clip. When the reproduction position (decode position) of the current reproduction clip is later than the nearly center position of the time length of the clip in the forward direction of the reproduction order of the clip, the next clip in the forward direction of the reproduction order of the current clip becomes the target reproduction clip. When the reproduction position (decode position) of the current reproduction clip is earlier than the nearly center position of the time length of the clip in the forward direction of the reproduction order of the clip, a clip earlier than the current clip in the forward direction of the reproduction order of the clip is the target reproduction clip.

2-1. Example of Structure of Reproduction Apparatus

Figure 17:
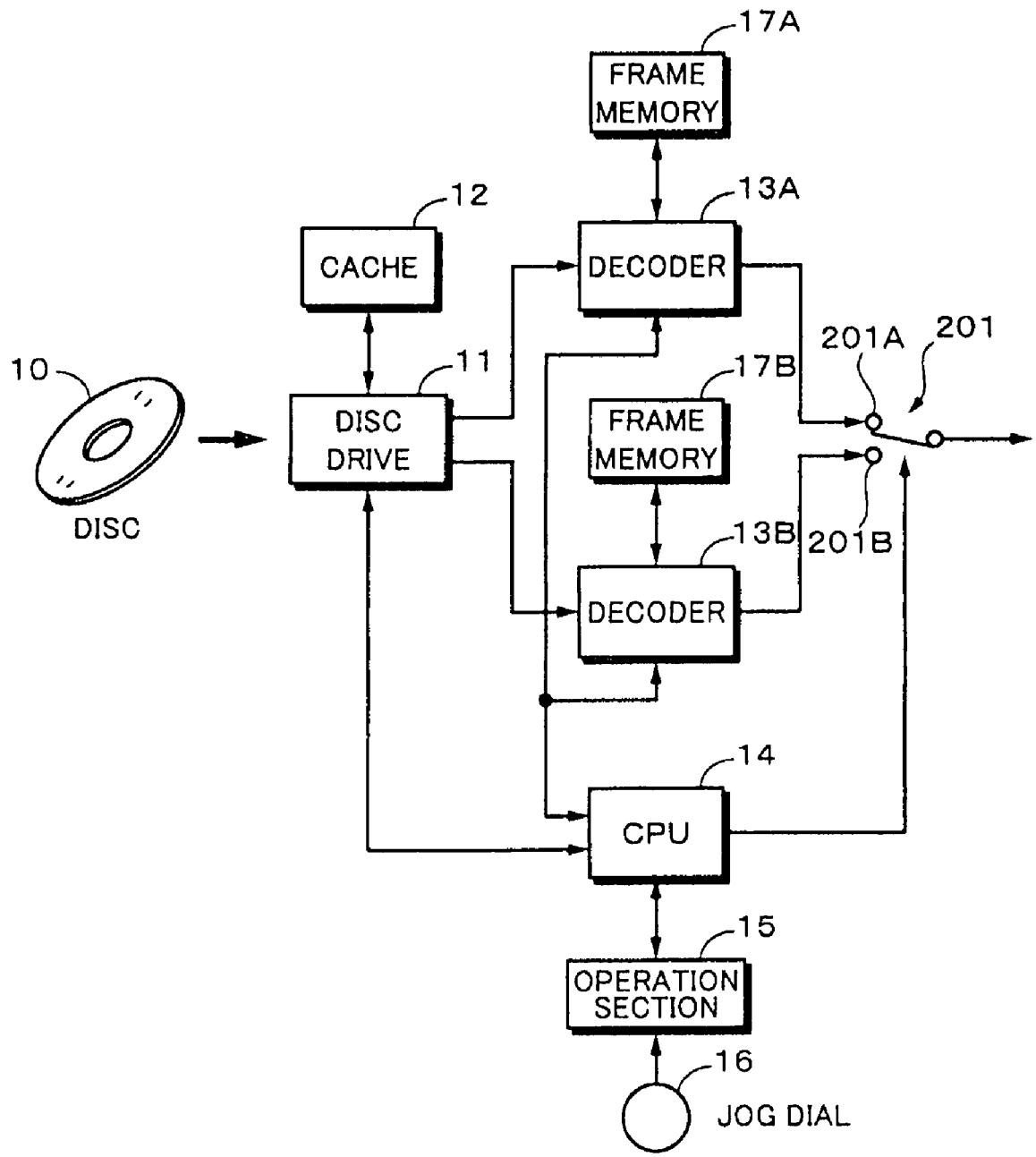
FIG. 17 is a block diagram showing an example of a structure of a reproduction apparatus according to an embodiment of the present invention.

FIG. 17 shows an example of a structure of a reproduction apparatus 200 according to this embodiment of the present invention. As exemplified in FIG. 17, the reproduction apparatus 200 is different from the reproduction apparatus 1 described with reference to FIG. 3 in that the former also includes a decoder 13B. The decoder 13 shown in FIG. 3 is represented as a decoder 13A in FIG. 17. Outputs of the decoder 13A and the decoder 13B are selected by a switch circuit 201 that are operated in synchronization with timing of each frame. In FIG. 17, similar sections to those in FIG. 3 will be represented by similar reference numerals and their description will be omitted.

The decoder 13A and the decoder 13B have the same specifications. For example, they have the structure as described with reference to FIG. 4 and FIG. 5. The decoder 13A has a frame memory 17A. The decoder 13B has a frame memory 17B. The operations of decoder 13A and the decoder 13B are independently controlled by the CPU 14. The drive 11 reads data from the disc 10 under the control of the CPU 14. The data that have been read from the disc 10 are supplied to the decoder 13A and the decoder 13B in a predetermined manner.

The decoder 13A and the decoder 13B decode the received data with the frame memory 17A and the frame memory 17B, respectively, under the control of the CPU 14. As described with reference to FIG. 2 and FIG. 11 to FIG. 16, a target frame buffer pattern is created based on the target reproduction frame and data are read from the optical disc 10 such that the target frame buffer pattern is filled with data. The target reproduction frame of one of the decoder 13A and the decoder 13B is a frame that belongs to the current reproduction clip. The target reproduction frame of the other of the decoder 13A and the decoder 13B is a frame at the reproduction start position of the target reproduction clip.

A decoder that decodes the current reproduction clip and another decoder that decodes the target reproduction clip can be freely designated. For example, these decoders may be designated by default in the system. Instead, the preceding processes may be taken over.

Outputs of the decoder 13A and the decoder 13B are supplied to a selection input terminal 201A and a selection input terminal 201B of the switch circuit 201, respectively. The switch circuit 201 selects the selection input terminal 201A or the selection input terminal 201B under the control of the CPU 14 such that an output of a decoder that decodes the current reproduction clip is selected. The switch circuit 201 is controlled in synchronization with timing of each frame.

2-2. Reproduction Control Process

Figure 18:
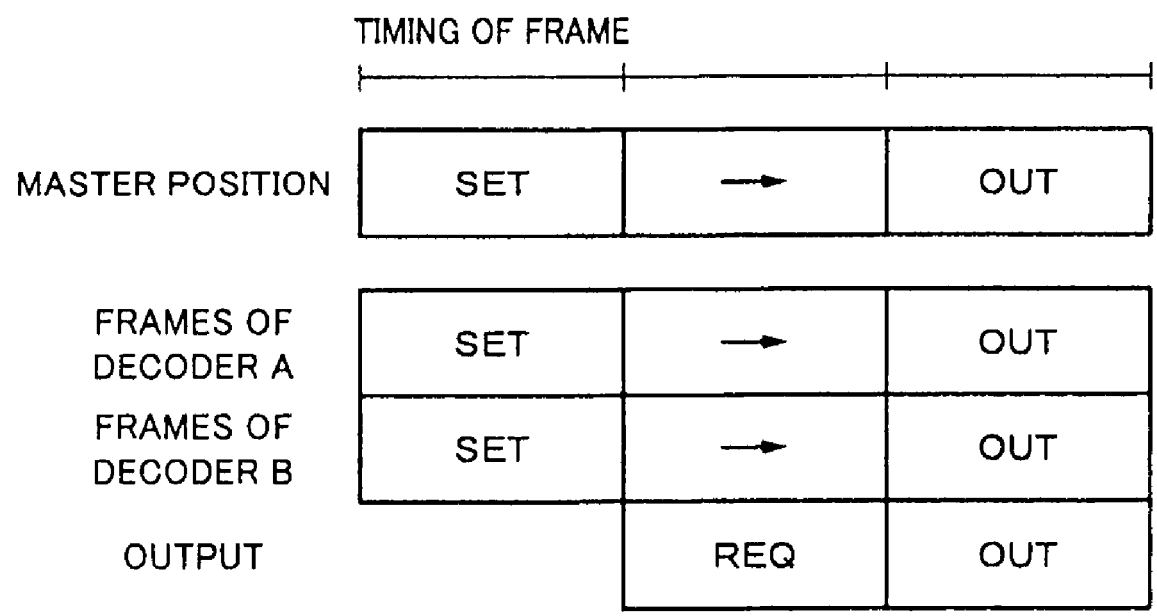
FIG. 18 is a schematic diagram showing an example of operations of two decoders at timing of each frame.

FIG. 18 shows an outline of operations of the decoder 13A and the decoder 13B at timing of each frame. A master position has information about a clip and a frame to be output. The master position is decided for example based on reproduction speed information. In other words, a frame to be output is decided based on clip information and frame information that the master position has.

An output is performed two frames after the master position has been set. While the reproduction operation is being performed at 1× speed in the forward direction, a frame represented by the master position is moved for one frame at timing of each frame. While the reproduction operation is being performed within 1× speed in the forward direction or the reverse direction by the jog dial 16 or the like, a frame represented by the master position are moved for one frame at timing corresponding to an operation of the jog dial 16.

In a frame period in which the master position has been set, a target reproduction frame is set to the decoder A and the decoder B. For convenience, it is assumed that the decoder A and the decoder B correspond to the decoder 13A and the decoder 13B shown in FIG. 17, respectively. One of the decoder A and the decoder B decodes the current reproduction clip, namely a clip that contains the master position. The other of the decoder A and the decoder B decodes the target reproduction clip. In this example, for convenience, it is assumed that the decoder A and the decoder B decode a clip that contains the master position and the target reproduction clip, respectively.

A frame represented by the master position is set as the target reproduction frame to the decoder A. A reproduction start frame of the target reproduction clip is set as the target reproduction frame to the decoder B. When these target reproduction frames are set to the decoder A and the decoder B, they create target frame buffer update patterns based on the target reproduction frames in the frame period and decode one frame in the next frame period.

A decoded result of the decoder A or a decoded result of the decoder B is selected based on the master position. In other words, a decoder to which the master position has been set as the target reproduction frame is selected. The switch circuit 201 is controlled based on the selected result. Video data are read from the frame memory of the selected decoder in one frame period.

When the clip information of the master position has been updated and a frames represented by the master position is moved in clips, the roles of the decoder A and the decoder B are changed. For example, in the case that the decoder A decodes a clip represented by the master position and the decoder B decodes the target reproduction clip, when the clip represented by the master position is updated from the current reproduction clip to the target reproduction clip, the frame represented by the master position is changed to the target reproduction frame of the decoder B and the target reproduction frame of the decoder A is changed to the reproduction start frame of the target reproduction clip.

Figure 19A:
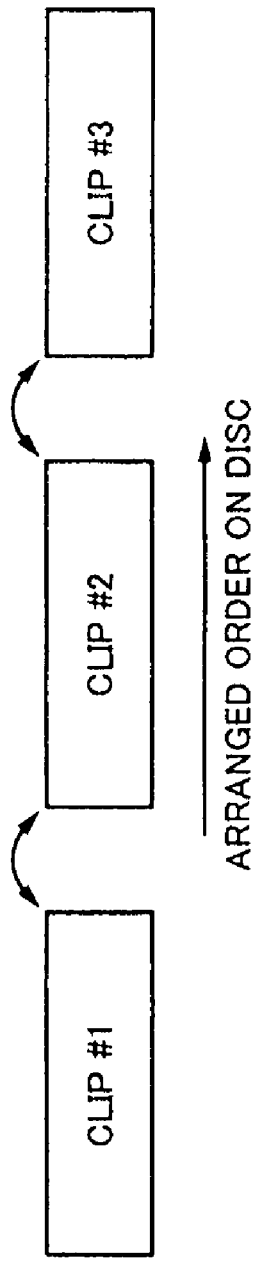
FIG. 19A and FIG. 19B are schematic diagrams showing a typical example a method of reproducing clips.
Figure 19B:
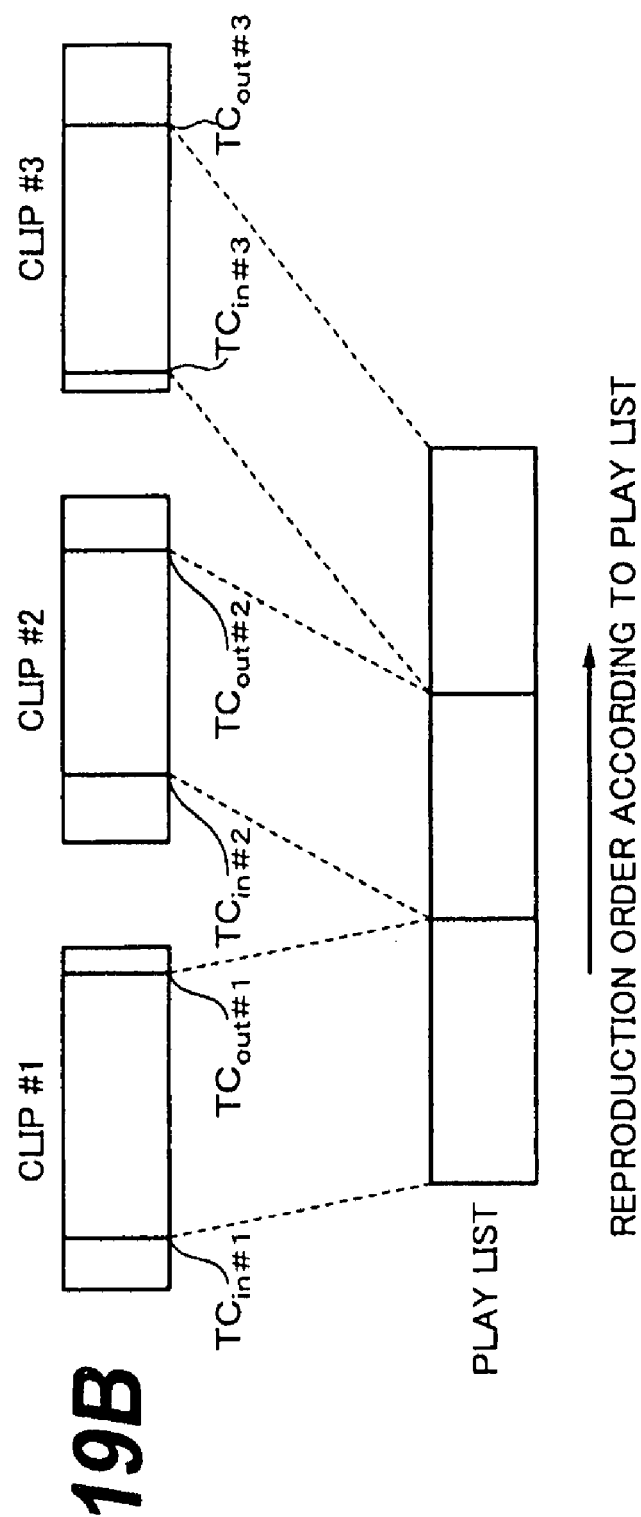

Next, the reproduction control process according to this embodiment of the present invention will be described. FIG. 19A and FIG. 19B show typical examples of methods of reproducing clips. FIG. 19A shows an example of which clips are reproduced in the physically arranged order on the disc. In the case that clips are arranged on the disc in the order of clip #1, clip #2, and clip #3, when these clips are reproduced in the forward direction, they are reproduced starting from the beginning of clip #1. After the reproduction position has come to the end of clip #1, the reproduction position is jumped from clip #1 to clip #2. Thereafter, clip #2 is reproduced from the beginning. After the reproduction position has come to the end of clip #2, the reproduction position is jumped from clip #2 to clip #3. Thereafter, clip #3 is reproduced from the beginning.

FIG. 19B shows an example of which clips are reproduced corresponding to a play list. The play list describes reproduction start positions (IN points) and reproduction end positions (OUT points) of clip #1, clip #2, and clip #3. The IN points and OUT points are described for example with time codes. When a play list is reproduced, clips are referenced on the basis of information of the IN points and OUT points described in the play list and the individual clips are successively reproduced.

In the example shown in FIG. 19B, clip #1 is reproduced, starting from IN point $TC_{in\#1}$. At OUT point $TC_{out\#1}$, the reproduction position is jumped from clip #1 to clip #2. Clip #2 is reproduced, starting from IN point $TC_{in\#2}$. At OUT point $TC_{out\#2}$ of clip #2, the reproduction position is jumped from clip #2 to clip #3. Clip #3 is reproduced, starting from IN point $TC_{in\#3}$.

In any of the method of reproducing clips in the arranged order on the disc shown in FIG. 19A and the method of reproducing clips corresponding to the play list shown in FIG.

19B, it is necessary to move frames among clips such that frames are successively output at timing of each frame.

The methods of reproducing clips shown in FIG. 19A and FIG. 19B are typical examples, not limited thereto.

Figure 20:
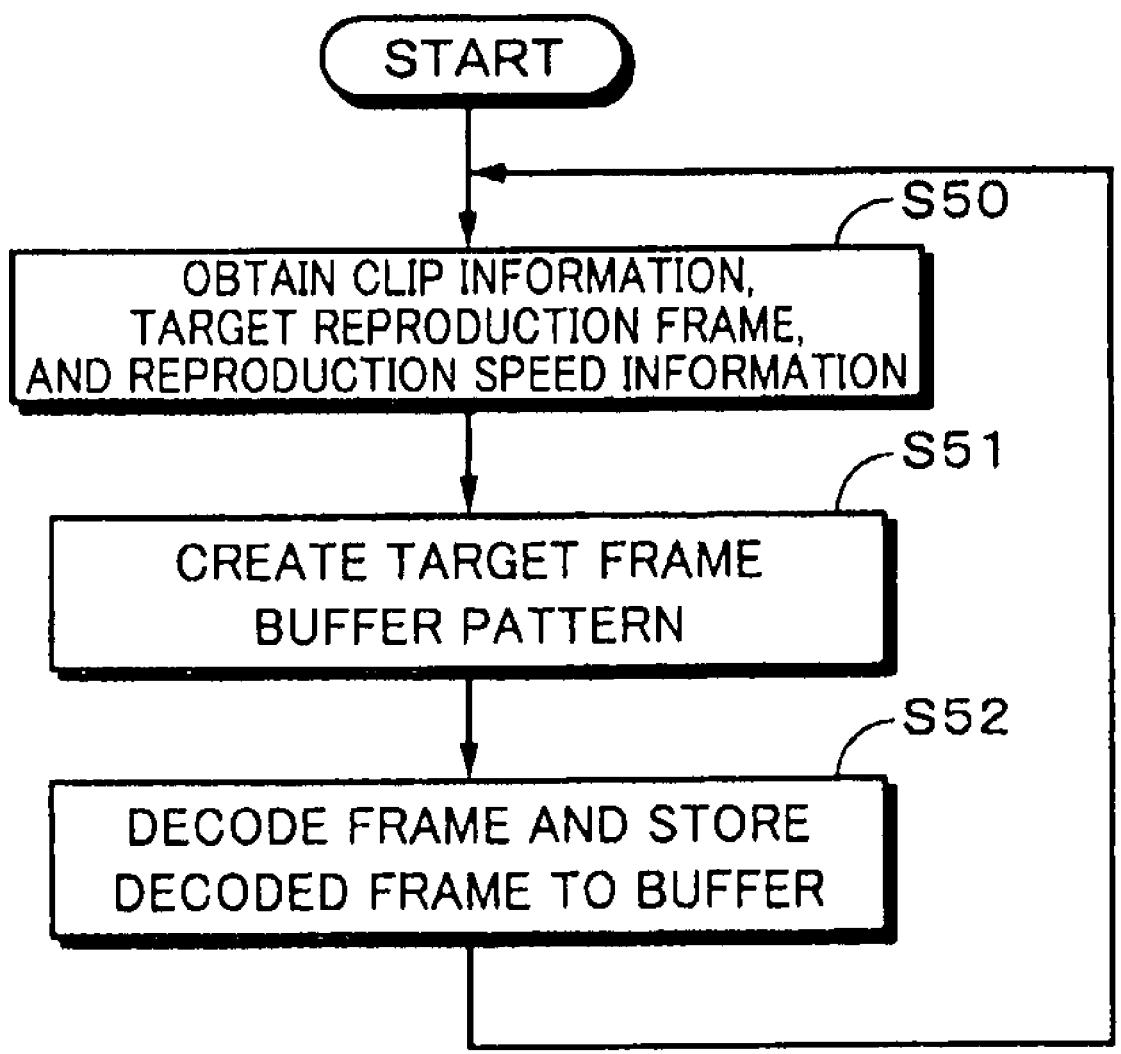
FIG. 20 is a flow chart showing an example of a reproduction control process for clips according to an embodiment of the present invention.

Next, with reference to flow charts shown in FIG. 20 to FIG. 22, an example of the reproduction control process according to this embodiment of the present invention will be described. In this embodiment, clips are reproduced by performing in parallel decode operations of the decoder 13A and the decoder 13B and control operations for the decoder 13A and the decoder 13B based on the master position. In other words, for example, the CPU 14 sets target reproduction frames for the decoder 13A and the decoder 13B based on the maser position whenever it is updated. The decoder 13A and the decoder 13B perform decode processes for the target reproduction frames that have been set by the CPU 14.

The processes of the decoder 13A and the decoder 13B are nearly the same as the process described with reference to FIG. 2. In other words, as outlined in FIG. 20, at step S50, information of a clip to be decoded, a target reproduction frame, and reproduction speed information are obtained. These information is supplied for example from the CPU 14 that performs processes, which will be described later with reference to FIG. 21 and FIG. 22. At step S51, a target frame buffer pattern is created based on the information about the clip to be decoded and the target reproduction frame. At step S52, the decode process is performed based on the created target frame buffer pattern. In other words, a picture to be newly decoded is extracted based on the target frame buffer pattern and an input of a stream is started. In addition, an unnecessary picture is extracted and a necessary picture is decoded and stored in a blank bank. Step S50 to step S52 are performed whenever the target reproduction frame is updated.

Figure 21:
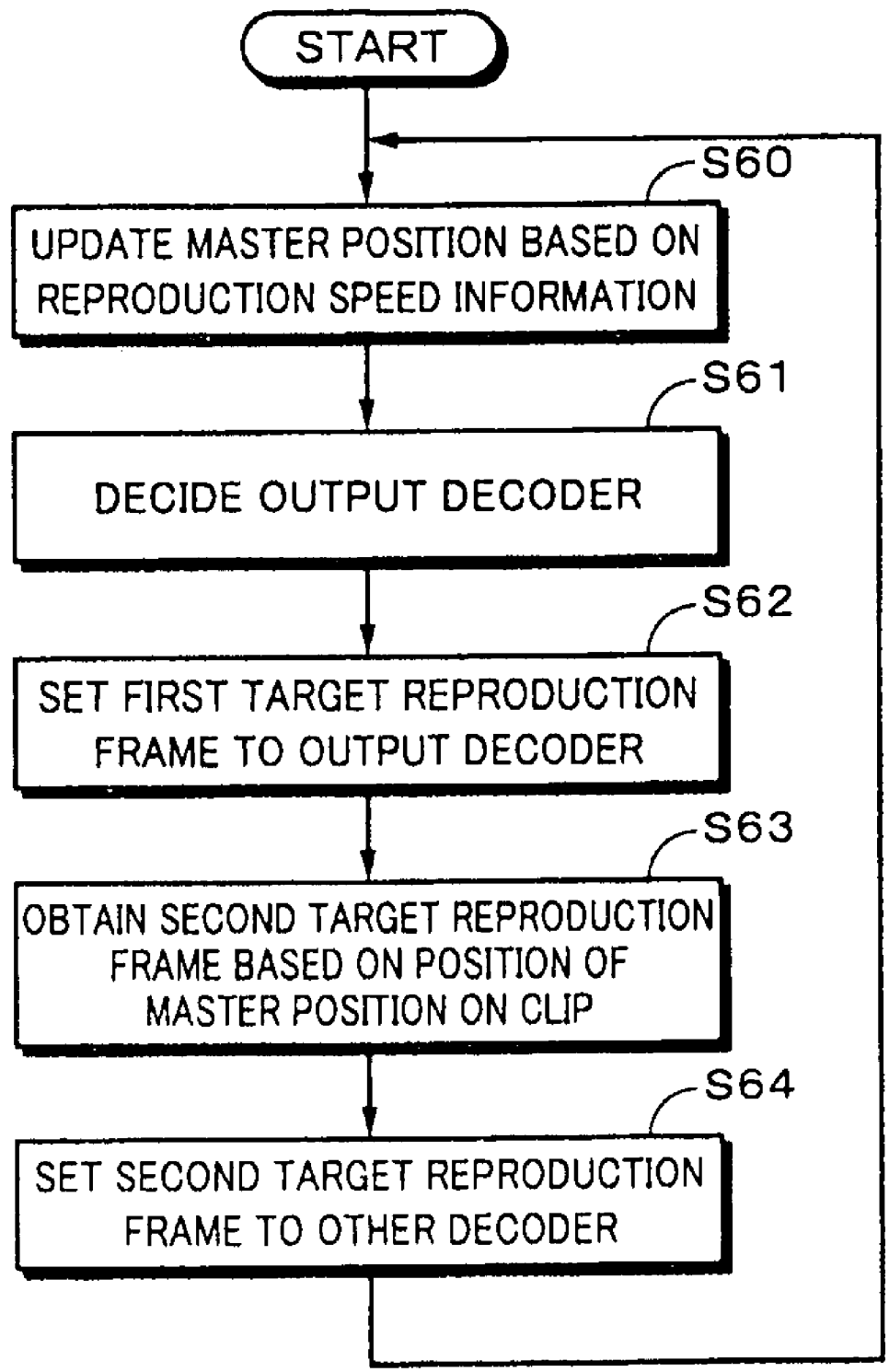
FIG. 21 is a flow chart showing an example of a reproduction control process for clips according to an embodiment of the present invention.

FIG. 21 is a flow chart showing an example of a process of the CPU 14 based on the master position. At step S60, when the master position is updated based on the reproduction speed information, the flow advances to step S61. At step S61, one of the decoder 13A and the decoder 13B is decided as an output decoder based on the updated master position. For example, the decoder whose frame buffer stores a frame represented by the master position is decided as the output decoder. The CPU 14 controls the switch circuit 201 to select the output decoder. The switch circuit 201 is controlled for example in synchronization with timing of each frame. In the following description, for convenience, the decoder that is not the output decoder is referred to the other decoder.

After the output decoder has been decided, the flow advances to step S62. At step S62, a frame represented by the master position is set as a first target reproduction frame to the output decoder. Thereafter, at step S63, a second target reproduction frame is obtained based on the position of the frame represented by the master position on the clip. At step S64, the second target reproduction frame is set to the other decoder. Step S60 to step S64 are performed whenever the master position is updated.

Figure 22:
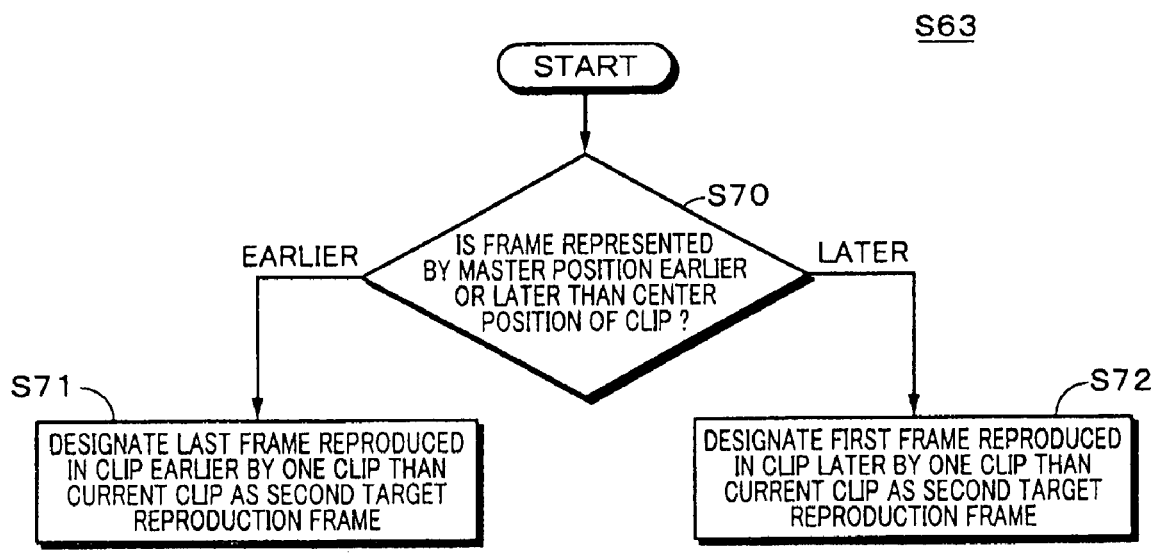
FIG. 22 is a flow chart showing an example of a reproduction control process for clips according to an embodiment of the present invention.

FIG. 22 is a flow chart showing an example of a method of obtaining the second target reproduction frame at step S63. At step S70, the current reproduction clip of the frame represented by the master position, namely the position represented by the master position to the center position of the clip is obtained. The frame represented by the master position and the center position of the clip are compared and the position of the frame represented by the master position to the center position of the clip is obtained.

When the direction of the reproduction operation is defined based on the arranged order of clips on the disc, it is determined whether the frame represented by the master position is earlier or later than the center position of the clip. When clips are reproduced based on a play list, the direction of the reproduction operation is determined based on the reproduction order defined in the play list.

When the determined result at step S70 denotes that the frame represented by the master position is earlier than the center position of the clip, the flow advances to step S71. At step S71, target reproduction frame $F_{prv}$ is set to a clip as the target reproduction clip earlier by one clip than the clip of the frame represented by the master position. Target reproduction frame $F_{prv}$ is the last frame in the reproduction order of the target reproduction clip. The target reproduction frame is supplied to the other decoder. The other decoder performs a process of creating a target frame buffer pattern shown in the flow chart of FIG. 20 based on target reproduction frame $F_{prv}$.

When the determined result at step S70 denotes that the frame represented by the master position is later than the center position of the clip, the flow advances to step S72. At step S72, target reproduction frame $F_{adv}$ is set to a clip as the target reproduction clip later by one clip than the clip of the frame represented by the master position. Target reproduction frame $F_{adv}$ is the top frame in the reproduction order of the target reproduction clip. Target reproduction frame $F_{adv}$ is supplied to the other decoder. The other decoder performs a process of creating a target frame buffer pattern shown in the flow chart of FIG. 20 based on target reproduction frame $F_{adv}$.

Next, an example of a method of obtaining the center position of the clip at step S70 will be described. The center position of a clip can be obtained for example based on picture pointer information described with reference to FIG. 10. In the example shown in FIG. 10, picture pointer information that represents information of individual frames is arranged in the display order and frame number order in the picture pointer table. Thus, when the number of records of the picture pointer information on the list is counted, frame number F of the clip can be obtained.

Figure 23A:
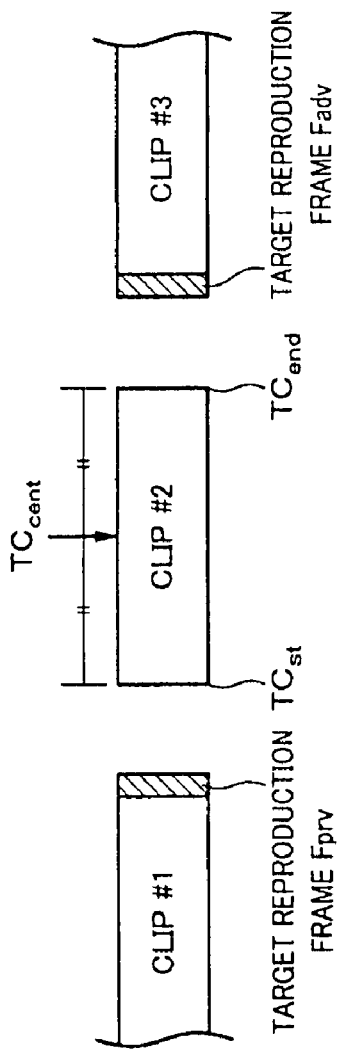
FIG. 23A and FIG. 23B are schematic diagrams describing a method of obtaining a center position of a clip and a target reproduction frame upon occurrence of a clip jump.

When clips are reproduced in the arranged order on the disc, as exemplified in FIG. 23A, nearly the center point of start $TC_{st}$ and end $TC_{end}$ of clip #2 that is currently being reproduced is center position $TC_{cent}$ of the clip. It can be thought that the factional part of the quotient of which frame number F is divided by 2 is rounded up and the result is treated as frame number $F_{cent}$ of the center of the clip. When frame number F is even, frame number $F_{cent}$ deviates from the accurate center position by 0.5 frames. In this case, it is assumed that frame number $F_{cent}$ is the center position of the clip.

Figure 23B:
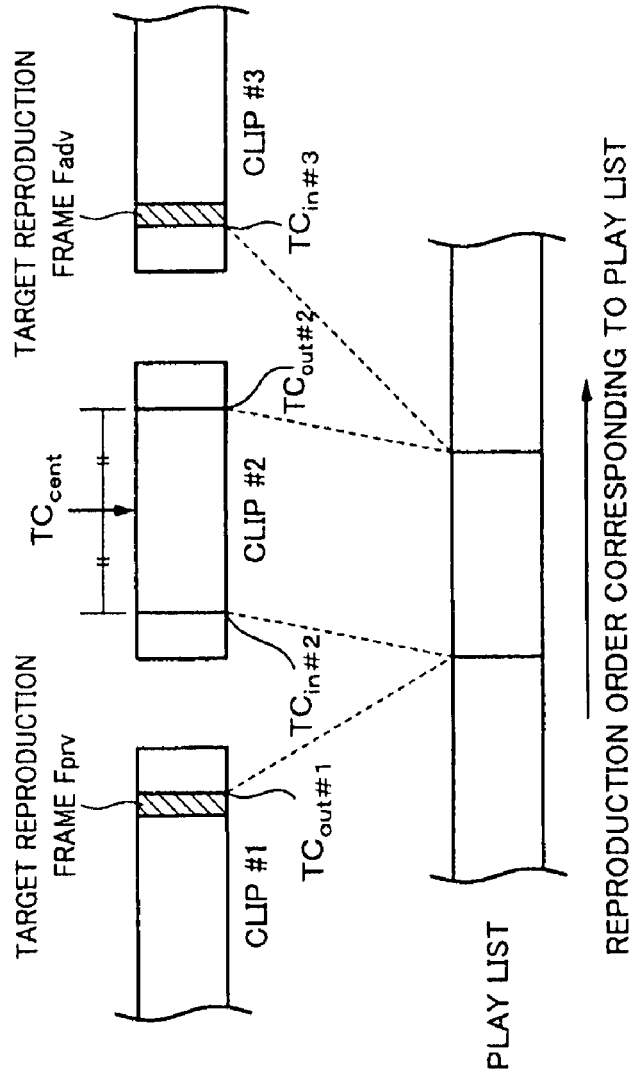

When clips are reproduced based on a play list, as exemplified in FIG. 23B, in clip #2 that is currently being reproduced, nearly the center point of In point $TC_{in\#2}$ and OUT point $TC_{out\#2}$ described in the play list is center position $TC_{cent}$ of clip #2. In this case, frame number $F_{in\#2}$ corresponding to IN point $TC_{in\#2}$ and frame number $F_{out\#2}$ corresponding to OUT point $TC_{out\#2}$ are obtained. Frame number $F_{in\#2}$ and frame number $F_{out\#2}$ are added and then divided by 2. The fragment part of the quotient is rounded up and treated as frame number $F_{cent}$ of the center of clip #2. When the number of frames between an IN point and an OUT point is even, frame number $F_{cent}$ deviates from the accurate center position by 0.5 frames. In this case, it is assumed that frame number $F_{cent}$ is the center position of clip #2.

A time code corresponding to the obtained frame number, $F_{cent}$, is obtained as the center position of the clip. Instead, frame number $F_{cent}$ may be obtained as the center position of the clip.

In this example, the center position of a clip is obtained based on the master position whenever the clip is reproduced.

Instead, when the optical disc 10 is loaded into the reproduction apparatus 200, data of the NRT area are read, and a picture pointer is obtained, the center position of each of clips on the optical disc 10 may be obtained in advance.

The method of obtaining the center position of each clip is not limited to such an example of this embodiment of the present invention.

Next, with reference to FIG. 23A and FIG. 23B, the process performed at step S71 and step S72 will be described more specifically. When clips are reproduced in the arranged order on the disc, as exemplified in FIG. 23A, a clip earlier by one clip than clip #2 represented by the master position is clip #1 adjacent to clip #2 in the forward reproduction direction on the disc. Target reproduction frame $F_{prv}$ is the last frame of clip #1 (at step S71). A clip later by one clip than clip #2 represented by the master position is clip #3 adjacent to clip #2 in the forward reproduction direction on the disc (at step S72). Target reproduction frame $F_{adv}$ is the top frame of clip #3 (at step S72).

When clips are reproduced corresponding to a play list, as exemplified in FIG. 23B, a clip earlier by one clip than clip #2 represented by the master pointer is clip #1 to be reproduced before clip #2 in the forward reproduction direction on the play list. Target reproduction frame $F_{prv}$ of clip #1 is a frame corresponding to OUT point $TC_{out\#1}$ designated to clip #1 on the play list (at step S71). A clip later by one clip than clip #2 represented by the master position is clip #3 to be reproduced after clip #2 in the forward reproduction direction on the play list. Target reproduction frame $F_{adv}$ of clip #3 is a frame corresponding to IN point $TC_{in\#3}$ designated to clip #3 on the play list (at step S72). When clips are reproduced corresponding to a play list, it is not necessary to arrange clips in their reproduction order on the disc.

Next, with reference to FIG. 17, the reproduction control process will be described in more details. When the output decoder is the decoder 13A, the selection input terminal 201A of the switch circuit 201 has been selected under the control of the CPU 14. The decoder 13B creates a target frame buffer update pattern based on target reproduction frame $F_{prv}$ or target reproduction frame $F_{adv}$ that has been set at step S64 shown in FIG. 21. Frames of the target frame buffer update pattern are decoded and stored in the frame memory 17B until it is filled therewith in a predetermined manner.

When clip information of the master position is updated, a frame represented by the master position is moved between clips. At this point, the output decoder is decided as the decoder 13B in the process at step S61. The selection input terminal 201B of the switch circuit 201 is selected under the control of the CPU 14.

In the decoder 13B, decoded frames of the target frame buffer update pattern created based on target reproduction frame $F_{prv}$ and target reproduction frame $F_{adv}$ that have been set at step S64 have been stored in a predetermined manner. Thus, immediately after the switch circuit 201 has been switched from the selection input terminal 201A to the selection input terminal 201B, frames can be output. As a result, frames of clips can be successively output at timing of each frame.

In addition, immediately after clip information of the master position has been updated and a frame represented by the master position has been moved between clips, a clip represented by clip information of the master position immediately before the clip information of the master position has been updated is a target reproduction clip. A target frame buffer update pattern is created based on a predetermined target reproduction frame that is set to the target reproduction clip and frames of the target reproduction clip are decoded.

Immediately after clip information of the master position has been updated, decoded frames of the target frame buffer update pattern have been stored in the frame buffer of the decoder that has decoded a clip represented by the clip information of the master position that has not been yet updated. Thus, immediately after the clip information of the master position has been updated, the jog can be operated within 1× reproduction speed in the forward direction and the reverse direction free of a drop of frames.

In other words, according to this embodiment of the present invention, a clip and a frame represented by the master position become a clip and a target reproduction frame that are directly decoded by a decoder that has been selected as the output decoder. A clip adjacent to a current reproduction clip becomes a target reproduction frame for the other decoder that has not been selected as the output decoder. In other words, a target reproduction frame and a target reproduction clip are usually supplied to the two decoders. These decoders independently perform a decode process based on each target reproduction position. Outputs of the two decoders are selected based on the master position such that frames are successively reproduced.

Next, with reference to FIG. 24, the reproduction control operation according to this embodiment of the present invention will be described. The reproduction control operation according to this embodiment is basically the same as that described with reference to FIG. 16. In other words, according to this embodiment, the output decoder and the other decoder are controlled in parallel.

Figure 24:
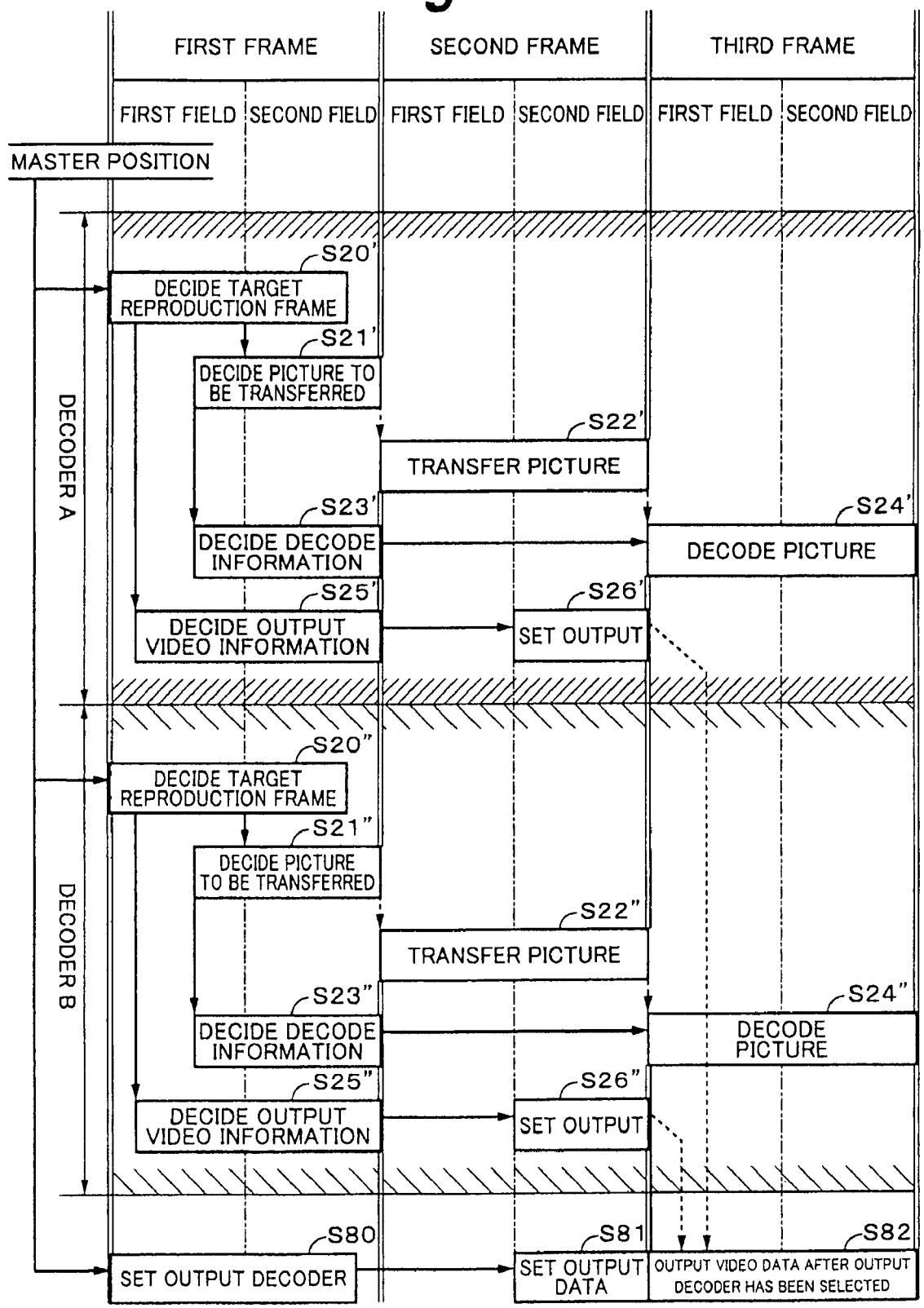
FIG. 24 is a schematic diagram describing a reproduction control operation according to an embodiment of the present invention.

In other words, as exemplified in FIG. 24, target reproduction frames of the decoder 13A and the decoder 13B are decided based on the master position (at step S20' and step S20"). The decoder 13A and the decoder 13B are controlled as described with reference to FIG. 16. Each of the decoder 13A and the decoder 13B decodes video data for one frame in a period of for example three frames. In addition, one of the decoders that has been selected based on the master position outputs video data for one frame from its frame buffer in synchronization with its decode process.

In the output decoder (for example, the decoder 13A) that decodes frames of a clip represented by the master position, a frame represented by the master position is decided as the target reproduction frame at the first frame (at step S20'). As described above, the master position is decided based on for example reproduction speed information. The reproduction speed information is designated for example by a system higher than the CPU 14 or by an operation of the operation section 15.

Thereafter, a picture to be transferred is decided (at step S21'), a decided picture is transferred (at step S22'), decode information is decided (at step S23'), and a picture transferred at step S22' is decoded based on the decided decode information (at step S24') in the same manner as those described with reference to FIG. 16.

In addition, based on the target reproduction frame decided at step S20', output video information is decided (at step S25') and an output is set (at step S26') in the same manner as those described with reference to FIG. 16.

The process of the decoder that decodes a frame of a predictive reproduction picture (reproduction frame (rear)) (for example, the decoder 13B) is performed in the same manner. A target reproduction frame is decided based on the master position at the first frame (at step S20"). In the decoder that decodes a reproduction frame (rear), a target reproduction frame is decided just based on the current position of a frame represented by the master position as described with reference to FIG. 22, FIG. 23A and FIG. 23B. Moreover, in this decoder, the target speed is 0.

Thereafter, a picture to be transferred is decided (at step S21"), the decided picture is transferred (at step S22"), decode information is decided (at step S23"), and a picture transferred at step S22' is decoded based on the decided decode information (at step S24') in the same manner as those described with reference to FIG. 16. Output video information is decided based on a target reproduction frame that has been set at step S20" (at step S25') and an output is set (at step S26') in the same manner as those described with reference to FIG. 16.

In addition, output data are decided based on the master position at timing of the first frame (at step S80). Output data are set at timing of the second frame (at step S81). For example, at step S81, the CPU 14 controls the switch circuit 201. Video data are output from the decoder that has been set at step S81 at timing of the third frame (at step S82).

The processes of step S20' to step S26', step S20" to step S26", and step S80 to step S82 are successively executed at timing of each frame. In other words, the output decoder that decodes a frame represented by the master position decides a target reproduction frame in synchronization with timing of the first frame at step S20'. The output decoder decides a new target reproduction frame corresponding to the decided target reproduction frame as a new output frame in synchronization with timing of the second frame.

Likewise, the other decoder that decodes a target reproduction clip decides a target reproduction frame in synchronization with timing of the first frame at step S20". The other decoder decides a new target reproduction frame corresponding to the decided target frame in synchronization with timing of the second frame. At this point, when a decoded frame is temporarily stored in the frame buffer, the remaining processes can be omitted. Specifically, after a decoded frame has been stored in the frame buffer, the other decoder continues to perform the decode process. At this point, the other decoder can perform the decode process only with data stored in the cache memory 12. Thus, the other decoder can perform the decode process without necessity of reading data from the optical disc 10.

In the foregoing embodiments, as the record medium, an optical disc is used and clips are recorded in an annual ring structure. However, embodiments of the present invention are not limited to such examples. In other words, the record format on the record medium is not limited to such an annual ring structure, but another format. In addition, the record medium is not limited to an optical disc. Instead, the record medium may be a hard disk or a semiconductor memory. In addition, the foregoing embodiments of the present invention are applied to data reproduced from the record medium. Instead, as long as a stream can be stably supplied, an embodiment of the present invention may be applied to a decoder device that decodes stream data supplied from an external device.

In the foregoing embodiments, the reproduction apparatus 200 is dedicated hardware that reproduces video data from the optical disc 10. Instead, the reproduction apparatus 200 may be a general purpose computer device (not shown) for example a personal computer. In this case, functions of the reproduction apparatus 200 may be accomplished by a program installed in the computer device. In this case, a decode process for video data may be accomplished by software that is executed on a CPU. Instead, the decode process may be accomplished by dedicated hardware installed in the computer device.

It should be understood by those skilled in the art that various modifications, combinations, sub-combinations and alternations may occur depending on design requirements and other factors insofar as they are within the scope of the appended claims or the equivalents thereof.

What is claimed is:

1. A reproduction apparatus, comprising:
a reproduction section which reproduces video data from a record medium, the video data being managed in a unit of a clip composed of a plurality of frames which are chronologically successive, each frame being one of I (Intra-coded) picture data, B (Bi-directional) picture data and P (predictive-coded picture data);
a decode section which (a) compares a storage state of a current frame pattern for a frame buffer, which stores a plurality of frames for the video data currently reproduced by the reproduction section, with a target reproduction frame buffer pattern which designates an output frame pattern of a plurality of frames necessary to decode a next frame, the target reproduction frame buffer pattern including the target frame and adjacent frames earlier and later than the target frame, (b) removes only one unnecessary frame in a current state of the frame buffer based on the comparison and (c) newly decodes and stores one new frame in an area which the one unnecessary frame is removed; and
a control section which controls the decode section to pre-decode a frame of a second clip and to store the pre-decoded frame in the frame buffer based on the target reproduction frame which is a frame which is currently being output in the first clip and a frame which is output at beginning of a second clip adjacent to the first clip in a reproduction order.

2. The reproduction apparatus as set forth in claim 1, further comprising:
a pattern generation section which generates a target reproduction frame buffer pattern which designates an output.

3. The reproduction apparatus as set forth in claim 1, wherein the target pattern is composed of at least the target reproduction frame, a frame chronologically adjacent to the target reproduction frame in a reproduction direction, and a frame necessary to continue to reproduce at least one frame in a direction from the target reproduction frame to the adjacent frame.

4. The reproduction apparatus as set forth in claim 1, wherein the decode section is composed of a first decode section and a second decode section, and
wherein the control section controls the first decode section such that a frame of the first clip becomes the target reproduction frame and the second decode section such that a frame which is output at beginning in the second clip becomes the target reproduction frame.

5. The reproduction apparatus as set forth in claim 4, wherein when a reproduction position is moved between clips, the control section controls the first decode section and the second decode section to switch their processes with each other.

6. The reproduction apparatus as set forth in claim 1, wherein the control section controls a clip adjacent to a decoded position side of the first clip in the reproduction order to become the second clip based on a nearly center position of a reproduction time length of the first clip.

7. The reproduction apparatus as set forth in claim 1, wherein the reproduction order of the first clip and the second clip is defined based on an arranged order of the first clip and the second clip on the record medium.

8. The reproduction apparatus as set forth in claim 7, wherein the control section controls a clip adjacent to a decoded position side of the first clip in the reproduction order to become the second clip based on a nearly center position or a reproduction time length of the first clip and an end frame of the second clip in the reproduction order to become the target reproduction frame, the end frame being adjacent to the first clip.

9. The reproduction apparatus as set forth in claim 4, wherein the reproduction order of the first clip and the second clip is defined based on a play list.

10. The reproduction apparatus as set forth in claim 9, wherein when the first decode section or the second decode section has decoded an IN point side of the first clip defined in the play list based on a nearly center position of a reproduction time length of the first clip, the reproduction time length being defined as an IN point and an OUT point in the play list, the control section controls a frame corresponding to the OUT point of the second clip to become the target reproduction frame.

11. The reproduction apparatus as set forth in claim 9, wherein when the first decode section or the second decode section has decoded an OUT point side of the first clip defined in the play list based on a nearly center position of a reproduction time length of the first clip, the reproduction time length being defined as an IN point and an OUT point in the play list, the control section controls a frame corresponding to the IN point of the second clip to become the target reproduction frame.

12. A reproduction method of a reproduction apparatus, comprising the steps of:

reproducing video data from a record medium, the video data being managed in a unit of a clip composed of a plurality of frames which are chronologically successive, each frame being one of I (Intra-coded) picture data, B (Bi-directional) picture data and P (predictive-coded picture data);

comparing a storage state of a current frame pattern for a frame buffer, which stores a plurality of frames for the video data currently reproduced at the reproduction step, with a target reproduction frame buffer pattern which designates an output frame pattern of a plurality of frames necessary to decode a next frame, the target reproduction frame buffer pattern including the target frame, and adjacent frames earlier and later than the target frame, removing only one unnecessary frame in a current state of the frame buffer based upon the comparison and newly decoding and storing one new frame in an area where the one unnecessary frame is removed; and controlling the decode section to pre-decode a frame of a second clip and to store the pre-decoded frame in the frame buffer based on the target reproduction frame which is a frame which is currently being output in the first clip and a frame which is output at beginning of a second clip adjacent to the first clip in a reproduction order.

* * * * *